US012600209B1

(12) United States Patent
Trusz

(10) Patent No.: US 12,600,209 B1
(45) Date of Patent: Apr. 14, 2026

(54) ADJUSTABLE LENGTH UTILITY VEHICLE CARGO BED CAP AND OVERHEAD RACK

(71) Applicant: Mark J. Trusz, Easton, PA (US)

(72) Inventor: Mark J. Trusz, Easton, PA (US)

( * ) Notice: Subject to any disclaimer, the term of this patent is extended or adjusted under 35 U.S.C. 154(b) by 358 days.

(21) Appl. No.: 18/351,400

(22) Filed: Jul. 12, 2023

Related U.S. Application Data

(60) Provisional application No. 63/388,497, filed on Jul. 12, 2022.

(51) Int. Cl.
B60J 7/04 (2006.01)
B60J 7/06 (2006.01)

(52) U.S. Cl.
CPC ............... B60J 7/041 (2013.01); B60J 7/062 (2013.01)

(58) Field of Classification Search
CPC .................................. B60J 7/062; B60J 7/041
USPC ....................................... 296/100.03, 100.04
See application file for complete search history.

(56) References Cited

U.S. PATENT DOCUMENTS

| | | | |
|---|---|---|---|
| 2,074,358 A | 3/1937 | Bixel et al. | |
| 2,824,764 A | 2/1958 | Stirling | |
| 2,853,340 A | 9/1958 | Hershberger | |
| 2,971,794 A | 2/1961 | Garcia | |
| 3,165,352 A | 1/1965 | Hallock et al. | |
| 3,342,523 A | 9/1967 | Lutgen | |
| 3,640,565 A | 2/1972 | Anderson | |
| 3,901,548 A | 8/1975 | Seaman, Jr. | |

| | | | |
|---|---|---|---|
| 4,068,886 A | 1/1978 | Gostomski | |
| 4,289,346 A | 9/1981 | Bourgeois | |
| 4,397,497 A | 8/1983 | Alonzo, Jr. et al. | |
| 4,648,649 A * | 3/1987 | Beal ......................... | B60P 3/42 |
| | | | 296/156 |
| 4,659,136 A | 4/1987 | Martin et al. | |
| 4,741,570 A | 5/1988 | Lovaas | |
| 4,770,461 A | 9/1988 | Lovaas | |
| 4,783,112 A | 11/1988 | Lovaas | |
| 4,784,429 A | 11/1988 | Hodges | |
| 4,832,395 A | 5/1989 | Lovaas | |
| 4,892,346 A | 1/1990 | Berlin | |
| 4,909,561 A | 3/1990 | Lovaas | |

(Continued)

FOREIGN PATENT DOCUMENTS

| | | |
|---|---|---|
| FR | 2615835 A1 | 12/1988 |
| GB | 2205282 A | 12/1988 |

(Continued)

*Primary Examiner* — Jason S Morrow
(74) *Attorney, Agent, or Firm* — Wilkinson Law Office; Clinton H. Wilkinson

(57) ABSTRACT

A truck bed cap assembly for a truck bed having a plurality of rigid telescoping cap sections mounted on guide rails secured extending longitudinally on opposite side walls of the truck bed, the cap sections being movable along the guide rails between fully retracted and fully extended positions and being lockable at any position along the guide rails, and a tailgate assembly including an upper tailgate section and a lower tailgate section extendable downwardly from the upper tailgate section to enclose an area between the upper tailgate section and truck bed floor and including a main panel dimensioned to fit between the wheel wells of the truck bed, and selectively extendable upper and lower side panels one or more of which are extended laterally outwardly from the main panel when the cap assembly is not fully extended to enclose the area underneath the cap.

20 Claims, 13 Drawing Sheets

(56) References Cited

U.S. PATENT DOCUMENTS

| | | | | |
|---|---|---|---|---|
| 4,932,717 | A | 6/1990 | Swann | |
| 4,974,898 | A | 12/1990 | Baranski | |
| D327,463 | S * | 6/1992 | Williams | D12/403 |
| 5,156,195 | A * | 10/1992 | Wehler | E04B 1/34305 |
| | | | | 160/202 |
| 5,192,107 | A | 3/1993 | Smith, Sr. | |
| 5,203,603 | A | 4/1993 | Hertzberg et al. | |
| 5,368,396 | A | 11/1994 | Cantrell | |
| 5,516,182 | A | 5/1996 | Aragon et al. | |
| 5,531,497 | A | 7/1996 | Cheng | |
| 5,927,782 | A | 7/1999 | Olms | |
| 6,244,651 | B1 | 6/2001 | Hecock, Jr. | |
| 6,439,646 | B1 | 8/2002 | Cornelius | |
| 6,505,879 | B1 | 1/2003 | Arviso | |
| 6,997,502 | B1 | 2/2006 | Reents | |
| D534,856 | S | 1/2007 | Herrera et al. | |
| 7,207,614 | B2 | 4/2007 | Briggs | |
| 7,452,024 | B2 * | 11/2008 | Landrith | B60J 7/041 |
| | | | | 296/100.04 |
| D586,722 | S | 2/2009 | Miller et al. | |
| D638,343 | S | 5/2011 | Kramer | |
| 8,087,716 | B2 | 1/2012 | Kramer | |
| 8,322,779 | B2 | 12/2012 | Kramer | |
| 8,540,302 | B2 | 9/2013 | Lenz, Jr. | |
| 8,783,755 | B2 | 7/2014 | Sinkauz | |
| 9,038,531 | B1 * | 5/2015 | Parshall | B60P 7/02 |
| | | | | 100/5 |
| 9,079,548 | B1 | 7/2015 | Singer | |
| 9,566,915 | B1 | 2/2017 | Singer | |
| 9,573,530 | B1 | 2/2017 | Singer | |
| 9,751,469 | B1 | 9/2017 | Singer | |
| 9,796,428 | B1 | 10/2017 | Tamaddon-Dallal et al. | |
| 9,827,916 | B1 | 11/2017 | Singer | |
| 10,000,114 | B2 | 6/2018 | Rohr et al. | |
| 10,343,616 | B2 | 7/2019 | Singer | |
| 10,414,258 | B2 | 9/2019 | Singer | |
| 10,493,831 | B2 * | 12/2019 | Singer | B62D 33/04 |
| 11,479,094 | B2 | 10/2022 | Klein | |
| 11,872,874 | B1 * | 1/2024 | Gonzalez Perez | B60J 7/041 |
| 11,987,109 | B1 * | 5/2024 | Hackler | B60J 7/041 |
| 2002/0190536 | A1 | 12/2002 | Getzschman et al. | |
| 2003/0098591 | A1 | 5/2003 | Leitner et al. | |
| 2005/0023314 | A1 * | 2/2005 | Williams | B60R 9/00 |
| | | | | 224/320 |
| 2006/0197352 | A1 | 9/2006 | Bassett | |
| 2008/0088151 | A1 | 4/2008 | Shagbazyan | |
| 2010/0194137 | A1 | 8/2010 | Kealy | |
| 2015/0321543 | A1 | 11/2015 | Fink | |
| 2016/0229274 | A1 | 8/2016 | Cote | |
| 2020/0369132 | A1 | 11/2020 | Biscan | |
| 2021/0023925 | A1 | 1/2021 | Dylewski, II et al. | |
| 2021/0129640 | A1 | 5/2021 | D'Hoore et al. | |
| 2021/0170847 | A1 | 6/2021 | Singer | |
| 2023/0041082 | A1 | 2/2023 | Klein | |
| 2025/0214407 | A1 * | 7/2025 | Singer | B60J 7/08 |

FOREIGN PATENT DOCUMENTS

| | | |
|---|---|---|
| GB | 2205282 B | 9/1991 |
| WO | 2013105860 A1 | 7/2013 |
| WO | 2021102174 A1 | 5/2021 |

* cited by examiner

ADJUSTABLE LENGTH UTILITY VEHICLE CARGO BED CAP AND OVERHEAD RACK

CROSS-REFERENCE TO PREVIOUS RELATED APPLICATIONS

This application claims priority to U.S. Provisional Pat. Appln. No. 63/388,497, filed on Jul. 12, 2022, the entirety of which application is hereby incorporated by reference herein.

FIELD OF THE INVENTION

The present invention relates to caps and enclosures for cargo beds of utility vehicles such as pickup trucks and other light trucks. More particularly, the invention relates to truck bed caps for utility vehicles having one or more longitudinally movable and telescopingly connected cap sections, which cap sections are selectively positionable to securely enclose different lengths and volumes of the truck bed.

BACKGROUND OF THE INVENTION

Light pickup-type trucks of a conventional construction including an enclosed cab located forward of an open cargo bed are popular among consumers both for business and personal use, in large part due to their versatility and the availability of many different accessories. At certain times it may be desirable to cover or enclose portions of the cargo bed to protect and secure items placed in the bed area, while at other times a cargo bed having an open top may be needed for hauling larger loads. Numerous cover assemblies for enclosing a pickup cargo area including shells, canopies, tonneau covers, and caps are therefore available.

Pickup truck cargo bed caps or tops may be hard-bodied coverings which are coupled to the opposing side walls, front wall, and rear wall or hinged tailgate of the truck bed body, and have a roof which extends over the flat cargo bed. The side walls of the truck cap often terminate at the approximate height of the pickup truck's cab section roof, which configuration enhances the aesthetic appearance similar to an SUV while at the same time providing adequate volume of under-roof storage space in the truck bed. Some truck caps have a fixed section which covers a forward portion of the cargo bed, and one or more additional sections that are movable between a stored position nested with the forward section and an extended position covering a rearward portion of the truck bed. The movable sections may be slidable on a rail mounted to the side walls of the truck bed, and the rearmost movable section may attach to the rear wall or tailgate when fully extended in order to completely cover the truck bed. When the rearmost section is not fully extended, a gap is formed between the lower edge of the rearmost section and the covered section of the truck bed. This gap must be closed in order to secure and protect cargo stored within the covered section of the truck bed when the truck cap is not fully extended.

U.S. Pat. No. 4,397,497 to Alonzo, Jr. discloses an expandable camper body having a movable rear cap section and a lower tailgate section which is hinged to the upper tailgate section. The lower tailgate section pivots downwardly from the upper tailgate section and locks to the flat truck bed in order to enclose the camper body when the rear cap section is telescoped into the front section. Cutouts are provided in the lower tailgate section in order to accommodate the wheel wells in the truck bed. The Alonzo, Jr. rear cap section, however, is only securable in either a fully extended or a fully telescoped position, and not in any intermediate positions. U.S. Pat. No. 4,659,136 issued to Martin et al. discloses a telescoping truck cap having four slidable cap segments. The rearmost segment has a tailgate door, and a lower gate member may be detachably connected to the tailgate door. An additional gate frame assembly is also provided which may be connected to the lower gate member to fully enclose the truck cap when the cap is extended to an intermediate length at which the rearmost end of the cap is not aligned between the truck bed wheel wells. While the Martin et al. truck cap may be secured at several intermediate lengths, the individual cap segments can only be secured in fully extended or fully telescoped positions with respect to adjacent cap segments. The detachable gate frame also must be stored in the truck bed when not in use, which is inconvenient and takes up valuable cargo space.

In view of the limitations of current truck bed cap systems, there remains a need for an extendable truck cap wherein the cap sections can be expanded and conveniently secured in a wider range of intermediate positions between a fully extended and a fully retracted position, to allow for better control of the volume of enclosed storage space in the truck bed at any time, and while also providing a secure storage enclosure at any of such extended positions. In addition, there is a need for a collapsible truck bed cap having a cargo rack that in some embodiments is extendable and retractable with the bed cap sections and has the versatility to be adapted for use by homeowners, campers, tradespersons, or in specialty industries such as farming.

BRIEF SUMMARY OF THE INVENTION

The present invention satisfies the above-described and other related needs by providing a selectively expandable and storable utility/adventure truck bed cap suitable for on-the-go truck owners such as contractors, landscapers, homeowners, and light truck owners needing the capability to carry long cargo in the truck bed and also to have an enclosed, lockable, rigid and weather resistant cap cargo area on demand. The present adjustable length utility vehicle cargo bed cap provides open truck beds with a lockable tool/cargo storage area as well as a cargo rack which is useful for transporting long cargo such as ladders, lumber and the like in the utility field and in some embodiments is extendable and retractable with the cap while in other embodiments is stationary and remains extended.

The truck cargo bed cap design comprises a plurality of cap sections and provides a fully rigid enclosure with a multi-functional tail gate hatch which can be utilized in any desired open/extended position of the truck cap ranging between fully extended and fully retracted positions. The rigid enclosure formed by the truck cap sections may be opened/extended to a desired intermediate length or opened fully to enclose the entire truck bed cargo area with the closeable tail gate hatch mating to the pickup truck tail gate for a locked secure weather resistant rigid enclosure. The multi-functional hatch includes a stowed away lower hatch door that when lowered will close off the truck bed cargo area covered by the truck cap sections and can be utilized at any open/extended length in the truck bed cargo area between a fully closed/retracted pickup truck cap and a fully open/extended rigid pickup truck bed enclosure covering the entire truck bed cargo area with a closable/lockable tail gate hatch.

In some embodiments the pro utility/adventure truck cap is configured for a standard eight-foot pickup truck cargo bed and may comprise three separate cap sections, each being slidable linearly on base rails anchored to the truck bed side walls having individual tracks for each cap section. For shorter pickup truck bed configurations, in some embodiments the pro utility/adventure truck cap may be comprised of two separate cap sections, and the base rails will have two individual tracks rather than three. Various materials may be used in construction of the pro utility/ adventure truck cap including but not limited to an aluminum, steel, expanded steel mesh, fiberglass, carbon fiber, and plastics.

The pro utility/adventure truck cap sections will have lockable panels for safeguarding items from any weather elements and against theft of items being stored or transported in the truck bed cargo area. In some embodiments, the panels may be secured against sliding on the base rails by locking handles which are individually activated to lock or unlock the individual cap sections against sliding in any desired longitudinal position over the truck bed. The truck cap assembly includes a lower tailgate assembly which is pivotally connected to an upper tailgate assembly such that the lower tailgate assembly may be utilized to enclose the area of the truck bed below the upper tailgate assembly when the cap is not fully extended. The lower tailgate assembly includes several slide-out panels which are selectively utilized to completely enclose the area of the truck bed covered by the cap sections according to whether the cap assembly is extended to a location aligned with the wheel wells of the truck bed or to a position not aligned with the wheel wells.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawing figures, which are incorporated in and form a part of the specification, are illustrative of aspects of the present invention which will become more fully understood together with the following detailed description, and are not meant to limit the scope of the disclosure in any manner, which scope shall be based on the claims.

DETAILED DESCRIPTION OF THE INVENTION

Figure 1:
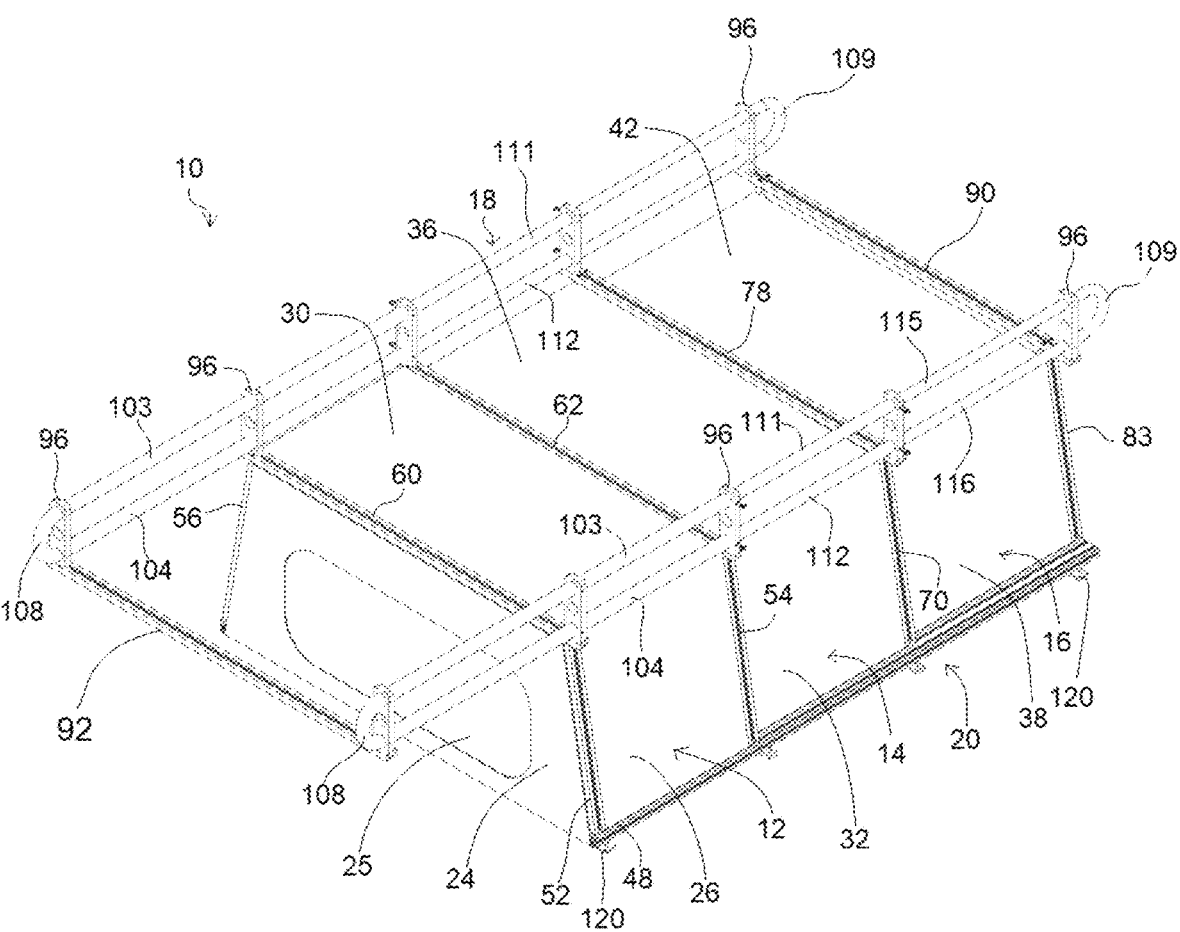
FIG. 1 is an isometric view from the front of an embodiment of the utility vehicle cargo bed cap assembly of the present invention in a fully extended position.

Reference will now be made in detail to embodiments of the present invention, examples of which are illustrated in the accompanying drawings. While the present invention will be described in conjunction with the various embodiment(s), the description is not intended to be understood in a limiting sense, but to be an example of the invention presented solely for illustration thereof, and by reference to which in connection with the following description and the accompanying drawings one skilled in the art may be advised of the advantages and benefits of the invention. On the contrary, the present invention is intended to cover alternatives, modifications, and equivalents, which may be included within the spirit and scope of the invention as defined by the appended claims. Further, it will be appreciated that embodiments of the present disclosure may employ any combination of features described herein. Descriptions of well-known starting materials, equipment, components and processing techniques may be omitted so as to not unnecessarily obscure the embodiments herein.

It is to be understood that the terminology used herein is for the purpose of describing particular embodiments only and is not intended to limit the full scope of the invention. The singular terms "a", "an" and "the", as used herein, are intended to include the plural forms as well, unless the context clearly indicates otherwise. The term "plurality", as used herein, is defined as two or more than two. The term "another", as used herein, is defined as at least a second or more. The terms "includes", "including" and/or "having", as used herein, are defined as comprising. The terms "joined"

and/or "coupled," as used herein, are defined as connected, although not necessarily directly, and not necessarily mechanically. To aid in describing the disclosure, directional terms may be used in the specification and claims to describe portions of the present disclosure (e.g., front, rear, left, right, top, bottom, upper, lower, inner, outer, side, etc.). These directional terms are intended to merely assist in describing and claiming the disclosure, but the present disclosure is not limited thereto. The terms "comprises," "comprising," or any other variation thereof are intended to cover a non-exclusive inclusion, such that an article, apparatus, process, or method that comprises a list of elements does not preclude the presence or addition of other elements not expressly listed or inherent to such article, apparatus, process, or method. An element proceeded by "comprises . . . a" does not, without more constraints, preclude the existence of additional identical elements in the article, apparatus, process or method that comprises the element. The terms "about" or "approximately" as used herein apply to all numeric values, whether or not explicitly indicated. These terms generally refer to a range of numbers that one of skill in the art would consider equivalent to the recited values (i.e., having the same function or result). Elements which are identical, similar, or functionally identical are provided in the figures with the same reference numerals and a repeated description of these elements is in some cases dispensed with in order to avoid redundancies.

The utility vehicle cargo bed cap assembly of the present invention includes a plurality of individual cap sections which can be independently and selectively positioned to enclose any range of different lengths or areas of an otherwise open top truck cargo bed between a fully expanded and fully retracted position. Utility vehicles such as pickup trucks conventionally include a cab portion and a cargo bed portion defined by a generally planar floor bordered by a transverse upright front end wall adjacent the cab portion, a pair of laterally spaced upright side walls extending from opposing sides of the floor, and a rear pivoting tailgate. Referring now to FIGS. 1-20, an embodiment of the utility vehicle or pickup truck bed cap assembly 10 is illustrated. In some embodiments, truck cap assembly 10 includes a front cap section 12, a middle or intermediate cap section 14, and a tailgate or rear cap section 16, wherein in a fully retracted position the middle cap section 14 is disposed between the front cap section 12 and tailgate cap section 16. In other embodiments, truck cap assembly 10 may comprise a greater or lesser number of cap sections as may be needed depending on the overall length of the truck bed and other consumer requirements. In some embodiments, cap assembly 10 includes a cargo rack designated generally by reference numeral 18, and also includes a main rails 20 and 22 which may be secured extending longitudinally to the top railings of the truck bed side walls Main rails 20 and 22 include longitudinally aligned tracks to which the front, middle, and rear or tailgate cap sections 12, 14, and 16 are slidingly coupled and supported on the truck bed.

Figure 2:
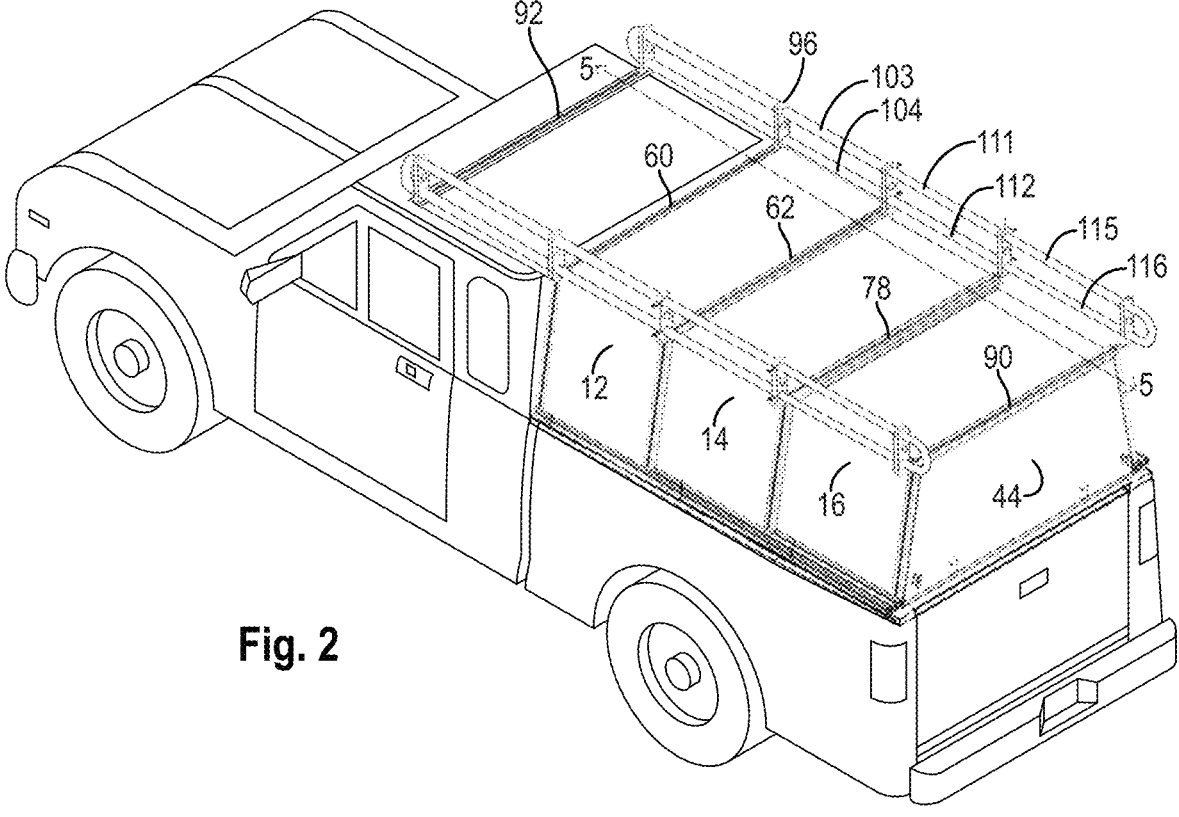
FIG. 2 is an isometric view from the rear of the utility vehicle truck bed cap shown in FIG. 1 also in a fully extended position on a truck bed.
Figures 6, 7, 8:
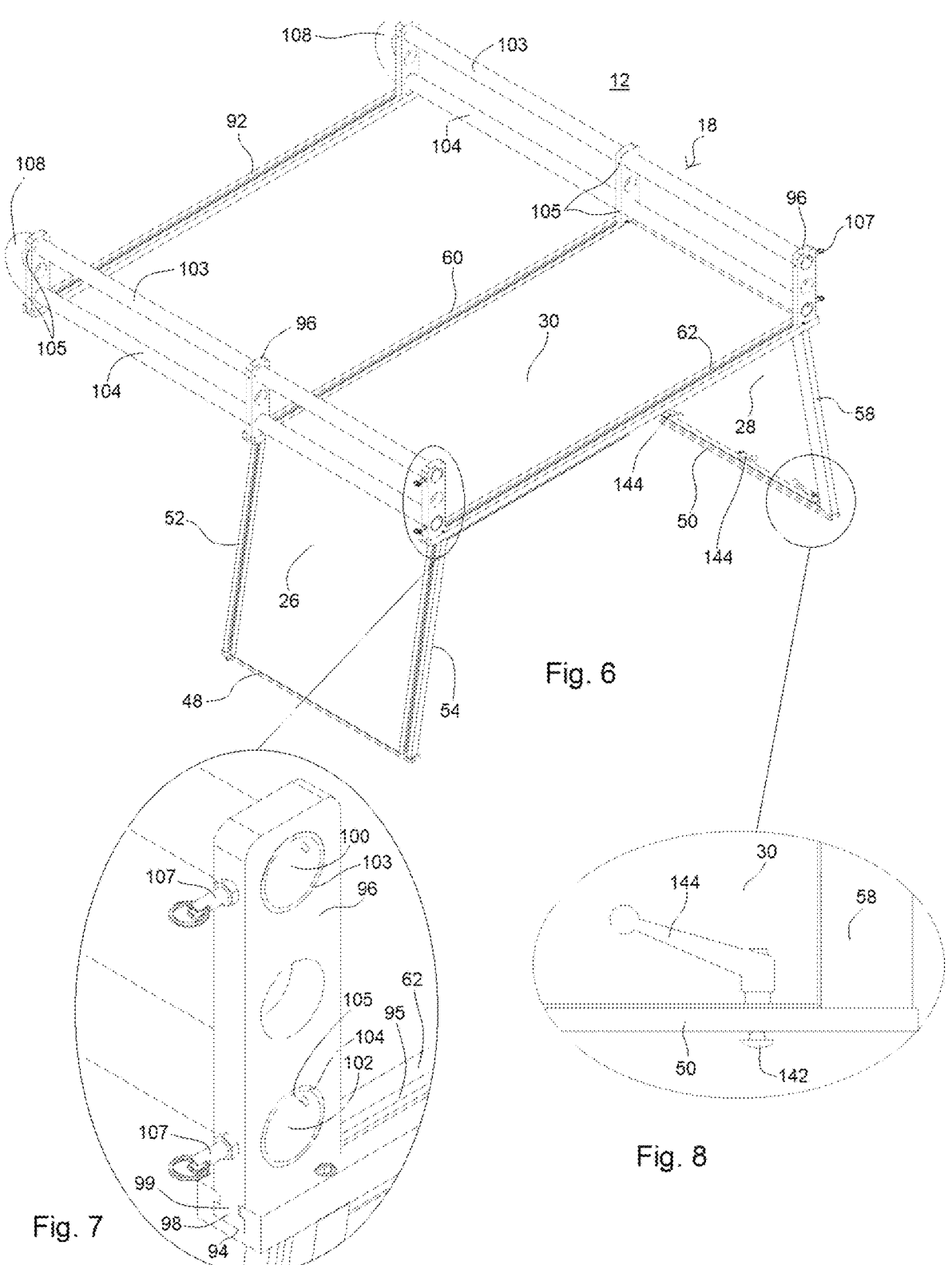
FIG. 6 is a top isometric view of the front cap section.
FIG. 7 is an enlarged fragmentary view of one of the rail supports of the front cap section shown in FIG. 6
FIG. 8 is an enlarged fragmentary view of one of the locking handles of the front cap section shown in FIG. 6.
Figure 9:
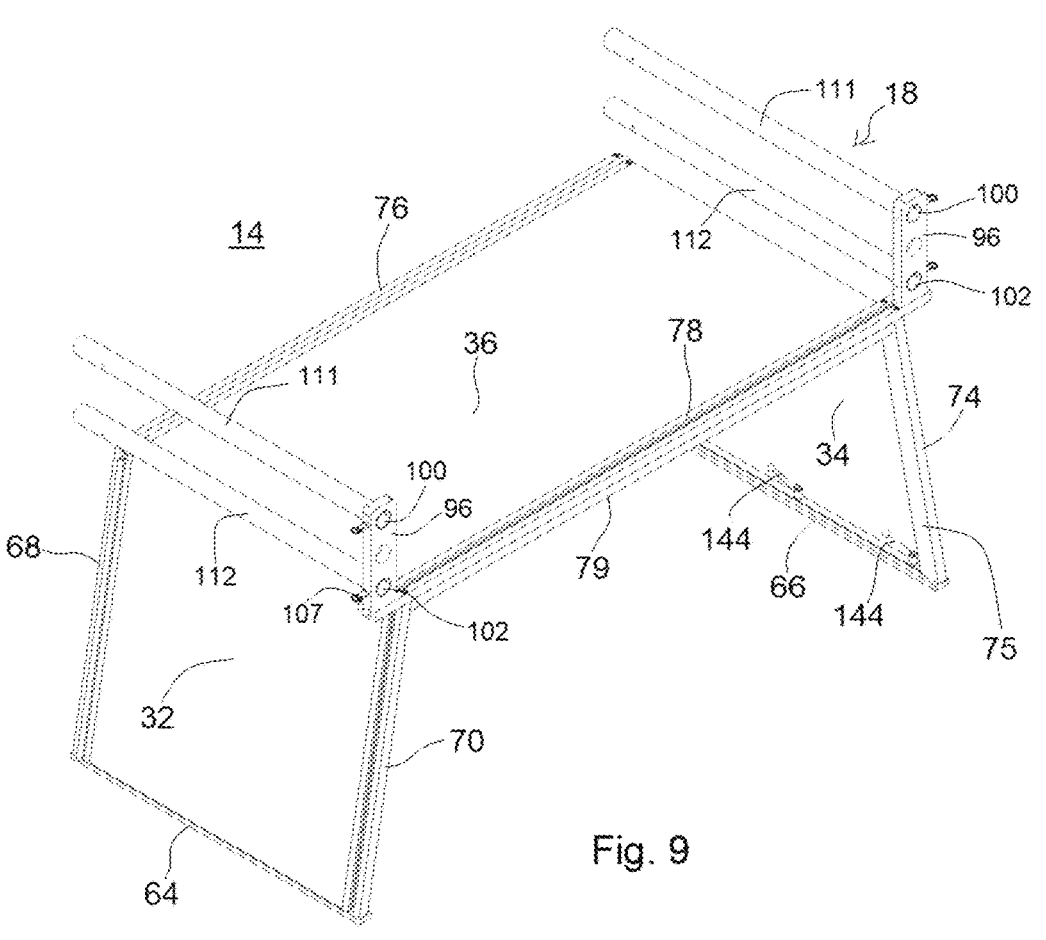
FIG. 9 is a top isometric view of the middle cap section.
Figure 10:
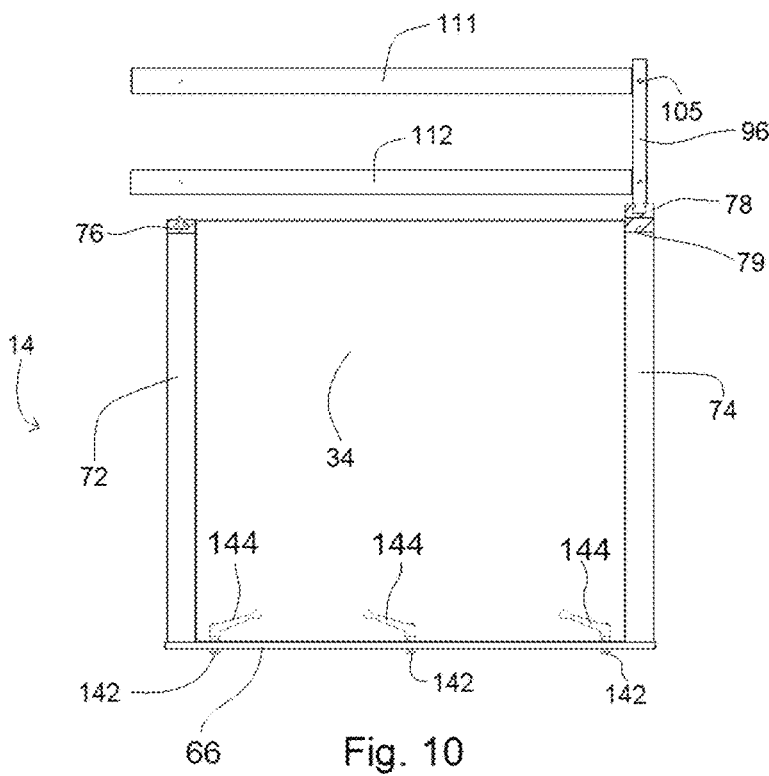
FIG. 10 is a side elevation view of the middle cap section.
Figure 11:
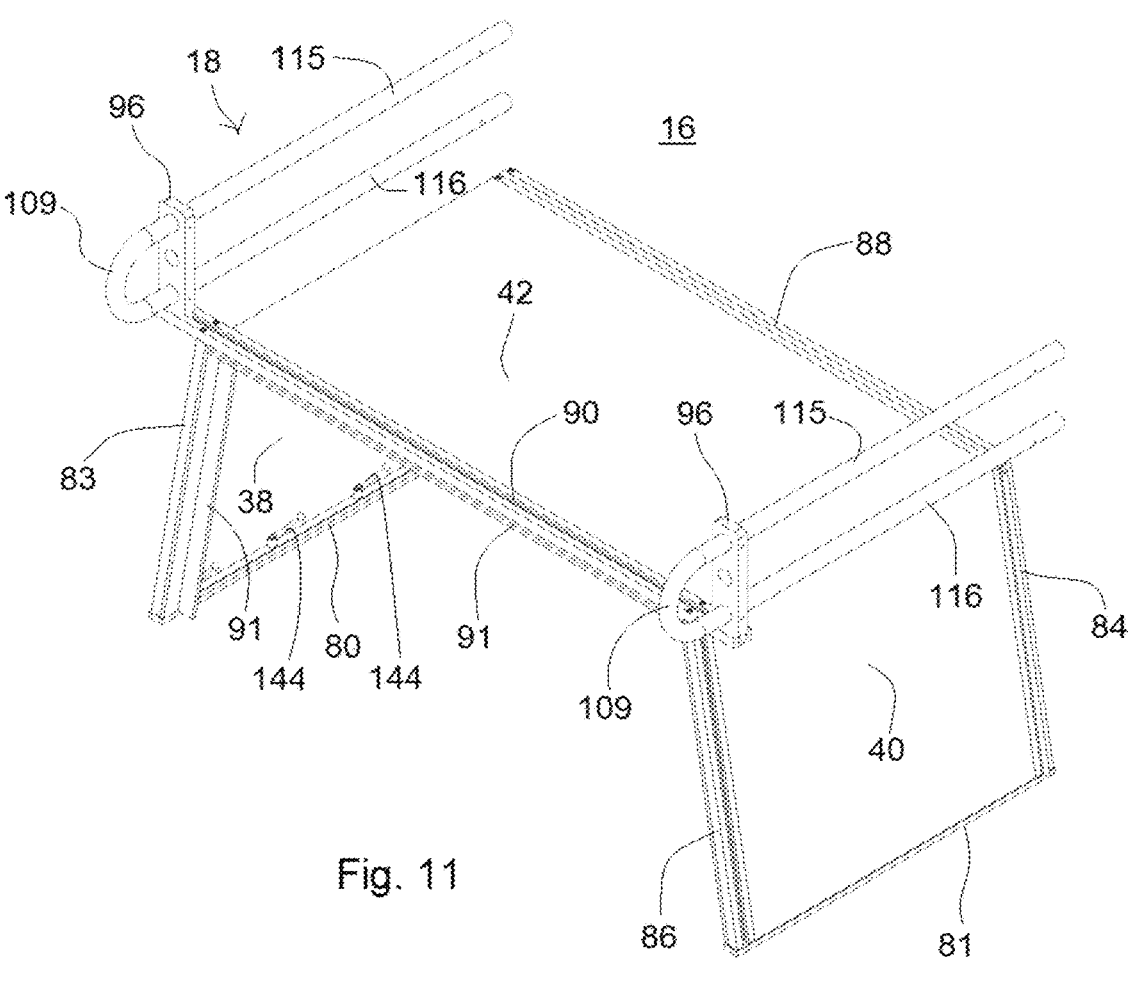
FIG. 11 is a top isometric view of the end or tailgate cap section.

The individual cap sections 12, 14 and 16 preferably have a rigid construction, and in the illustrated embodiment are formed of a framework which supports one or more rigid wall panels. Any suitable material or combination of materials may be used in the manufacture of the framework and wall panels of the cap sections, including but not limited to aluminum, galvanized steel, sheet metal, and/or plastics. Front cap section 12 will be positioned directly behind the pickup truck cab and as best shown in FIGS. 1 and 6 includes a front wall panel 24, opposite side wall panels 26 and 28, and a top wall panel 30. Window 25 is optionally mounted in front wall panel 24. In some embodiments, window 25 may be stationary, while in other embodiments window 25 may be pivotable or sliding. As best shown in FIG. 9, intermediate section 14 includes opposite side wall panels 32 and 34, a top wall panel 36, and is open in the front and rear. As best shown in FIG. 11, tailgate section 16 includes opposite side wall panels 38 and 40, a top wall panel 42, and as shown in FIG. 2 a pivoting rear tailgate 44, which as described in greater detail below comprises an upper tailgate assembly 150 and lower tailgate assembly 152. The side and top wall panels of the cap sections 12, 14, and 16 may be formed as individual sheets or panels or as a single sheet or panel which has been bent or angled into a downward U-shape.

Figures 3, 4, 5:
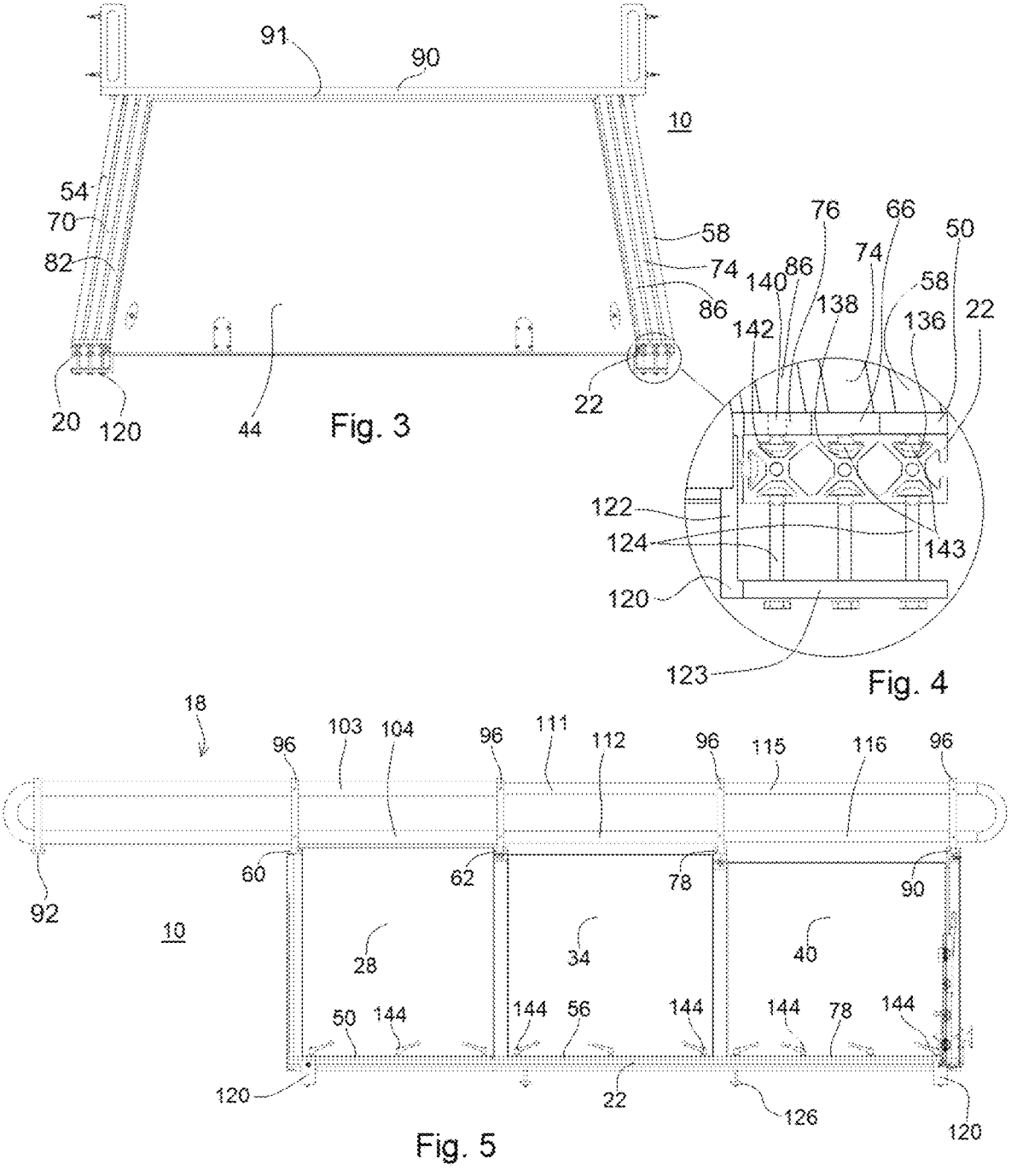
FIG. 3 is a rear elevation view of the utility vehicle truck bed cap.
FIG. 4 is an enlarged view of one of the main rails shown in FIG. 3.
FIG. 5 is a sectional view of an interior side wall of the utility vehicle truck bed cap taken along line 5-5 in FIG. 2.
Figures 19, 20:
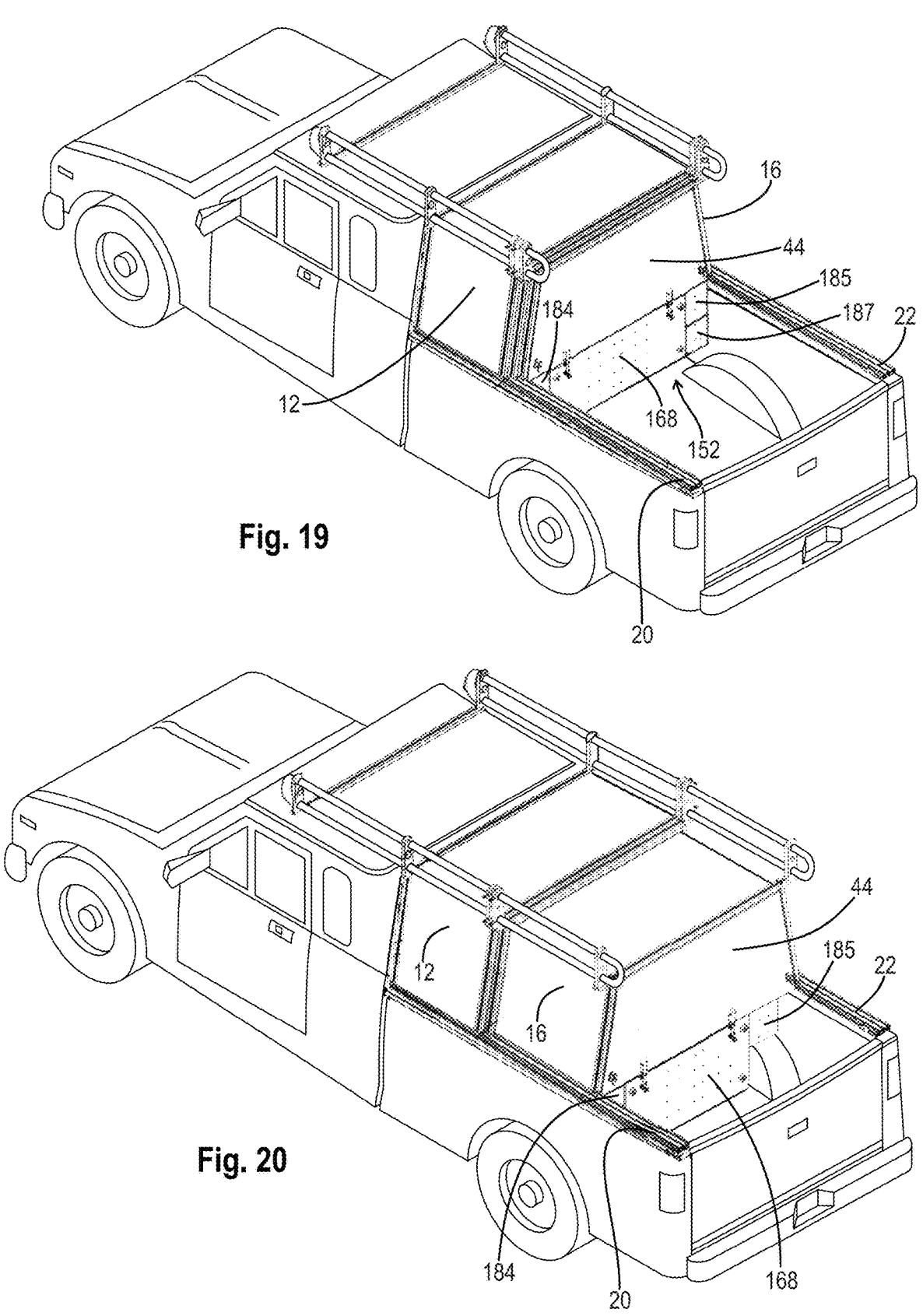
FIG. 19 a top rear isometric view of the utility vehicle truck bed cap assembly shown in FIG. 1 in a fully retracted position.
FIG. 20 a top rear isometric view of the utility vehicle truck bed cap assembly shown in FIG. 19 with only the rear cap section extended.

Front cap section 12, middle cap section 14, and rear cap section 16 of the truck cap assembly 10 are similarly shaped and successively smaller in size. As such, middle cap section 14 is slightly shorter in height and width than front cap section 12, and rear cap section 16 is slightly shorter in height and width than intermediate cap section 14. As shown in FIGS. 3 and 19, intermediate section 14 therefore can be telescoped into front section 12, and rear section 16 can be telescoped into intermediate section 14. The truck cap sections 12, 14, and 16 as discussed below can be individually positioned and secured to enclose different lengths of the truck bed as may be needed.

In the illustrated embodiment, each of the cap sections 12, 14, and 16 has a rigid framework which supports the wall panels. As shown in FIG. 6, cap section 12 includes a pair of base members 48 and 50, which as detailed below are configured to be slidably coupled to main rails 20 and 22, respectively. Forward and rearward upright members 52 and 54 are secured to the base member 48 in a spaced apart relation by suitable fasteners such as one or more flat head cap screws, while forward and rearward upright members 56 and 58 are similarly secured to the base member 50 in a spaced apart relation. Forward cross rail 60 connects between the upper ends of forward upright members 52 and 56, and rearward cross rail 62 similarly connects between the upper ends of rearward upright members 54 and 58. As is illustrated in FIG. 1, front wall panel 24 is suitably secured between forward upright members 52 and 56 and forward cross rail 60. In addition, side wall panel 26 is suitably secured between base member 48 and front and rear uprights 52 and 54, side wall panel 28 is suitably secured between base member 50 and front and rear uprights 56 and 58, and top wall panel 30 is suitably secured between cross rails 60 and 62. In addition, cargo rack 18 is mounted to cross rails 60 and 62 as described in greater detail below.

Referring now in particular to FIG. 9, middle cap section 14 includes base members 64 and 66 which are configured to be slidably coupled to main rails 20 and 22, respectively. Spaced-apart forward and rearward upright members 68 and 70 are connected to base member 64 by suitable fasteners such as but not limited to one or more flat head cap screws, and spaced-apart forward and rearward upright members 72 and 74 are similarly connected to base member 66. Forward cross rail 76 connects between the outer ends of forward upright members 68 and 72, and rearward cross rail 78 connects between the outer ends of rearward upright members 70 and 74. A spacer rail 79 also connects between rear uprights 70 and 74 underneath rear cross rail 74. A suitable weather seal 75 is also coupled to middle cap section 14 along the edges of upright members 68, 70, 72 and 74, top rail 76, and spacer bar 79 coupled to top rail 78. Side wall panel 32 is suitably secured between base member 64 and front and rear uprights 68 and 70, side wall panel 34 is suitably secured between base member 66 and front and rear uprights 72 and 74, and center or top wall panel 36 is suitably secured between front and rear cross rails 76 and 78. Front uprights 68 and 70 of middle cap section 14 are shorter in length than front and rear uprights 52-58 of front cap section 12. In addition, uprights 68,72 and 70,74 are closer together than uprights 52,56 and 54, 58 in front cap section 12. As a result, the forward cross rail 76 of middle cap section 14 is able to slide under rearward cross rail 62 of front cap section 12 such that the middle cap section 14 can be nested with the front cap section 12. Rear uprights 70 and 74 of middle cap section 14 in the illustrated embodiment have the same length as uprights 52-58 of front cap section 12. Cargo rack 18 is mounted on rear cross rail 74 of middle rack section 14 and thus will be at the same height as on front cap section 12. Spacer rail 79 which connects between rear uprights 70 and 74 underneath rear cross rail 74 provides additional structural support for the cargo rack 18.

Figure 12:
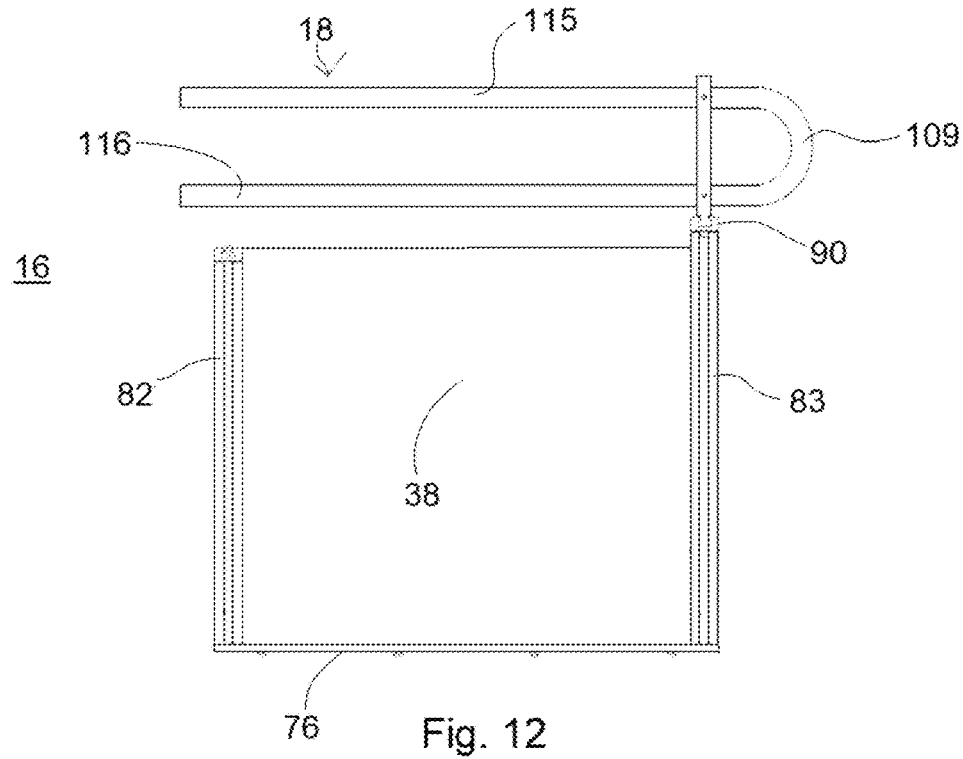
FIG. 12 is a side elevation view of the tailgate cap section without the tailgate door attached.

Referring now in particular to FIGS. 11 and 12, tailgate section or cap section 16 includes base members 80 and 81 which are configured to be slidably coupled to main rails 20 and 22, respectively. Spaced-apart forward and rearward upright members 82 and 83 are secured to opposite ends of the base member 80 by suitable fasteners such as but not limited one or more flat head cap screws, and spaced-apart forward and rearward upright members 84 and 86 are similarly connected to base member 81. Forward cross rail 88 connects between forward upright members 82 and 84, and rear cross rail 90 connects between rearward upright members 83 and 86. Tailgate assembly 44, shown in FIG. 1, is not shown connected to the rear cap section 16 in FIG. 11. Forward upright members 82 and 84 of tailgate cap section 16 are shorter than rearward upright members 70 and 74 of middle cap section 14. In addition, uprights 82,84 and 83,86 are closer together than uprights 68,72 and 70,74 in front cap section 12. As a result, forward cross rail 88 is able to slide underneath spacer 79 of the middle cap section 14 when the cap sections are fully or partially telescoped. As illustrated in FIG. 12, rear uprights 83 and 86 on tailgate cap section 16 are preferably the same length as rear uprights 70 and 74 and spacer 79 on middle cap section 14, such that the cargo rack 18 which is supported on cross rail 90 is at the same height on all of the cap sections. A hatch hinge mounting rail 91 is secured extending around the inner periphery of rear uprights 83 and 86 and cross rail 90 and creates a jamb or framework for attaching hatch 44 to cap section 14 and a surface against which hatch 44 rests to create a proper closure.

Referring now to FIG. 3, in the illustrated embodiment, the pairs of forward and rearward uprights of the front cap section 12, middle cap section 14, and rear cap section 16 are mounted to their respective base members at a similar inward angle, such that in an end view the framework of each cap section 12, 14, and 16 has a trapezoidal shape. As shown in FIG. 5, forward and rearward cross rails 60 and 62 of front cap section 12, rearward cross rail 78 of middle cap section 14, and rearward cross rail 90 of tailgate cap section 16 are substantially horizontally aligned, such that when the truck cap assembly 10 is secured to a vehicle bed the cargo rack 18 is also substantially horizontal. An additional cross rail 92 positioned forward of cross rail 60 is rigidly coupled between the rails of the cargo rack 18 in alignment with cross rails 60, 62, 78, and 90, and is provided to support long cargo on the cargo rack 18 such as a ladder extending above the truck cab roof so that no damage is caused to the truck cab roof by the cargo.

In the illustrated embodiment, the cross rails 60, 62, 78, 90, and 92 of the cargo rack 18 are T-slotted and is visible in FIG. 7 comprise a channel 94 having an upwardly open slot 95. In the illustrated configuration, the outer ends of cross rails 60, 62, 78 and 90 extend outwardly beyond their connection point with their respective supporting uprights, although it will be understood that in other embodiments the cross rails may have a greater or lesser length. Mounting blocks 96 each forming a component of the cargo rack 18 are shown secured near the outer ends of each cross rail 60, 62, 78, 90 and 92, such that in the illustrated embodiment there are ten mounting blocks 96. As shown in FIG. 7, mounting blocks 96 have a lower extension 98 which fits in channel 94 and a narrowed neck portion 99 which extends upwardly through slot 95 in the cross rails. Mounting blocks 96 are secured against sliding in channel 94 by a suitable fastening means, such as by passing one or more fasteners through an aperture in an underside of the cross rail into the extension 98, which fasteners in an embodiment may be a socket head cap screw and washer. Mounting blocks 96 support the rail sections of the cargo rack 18 extending between the aligned mounting blocks 96. The position of mounting blocks 96 on the cross rails may be adjusted such that the rail sections can be positioned to support narrower or wider cargo as needed. As shown in FIG. 7, in the illustrated embodiment, each of the mounting blocks 96 has at least an upper aperture 100 and a lower aperture 102 in which the parallel tubular rails of the rail sections of the cargo rack 18 are supported. While the tubular rails of cargo rack 18 are illustrated as being cylindrical, it will be understood the rails may have other shapes including but not limited to a rectangular or square shaped tubing. In FIG. 6, the tubular rails mounted to front cap section 12 are indicated as upper rail section 103 and lower rail section 104. The mounting blocks 96 are mounted to the cross rails 60, 62, and 90 with upper apertures 100 aligned to receive upper cargo rail section 103, and with lower apertures 102 aligned to receive lower cargo rail section 104.

In the presently described embodiment, cargo rack 18 is adapted to be expanded and retracted with the truck cap sections. The upper and lower rail sections 103 and 104 of front cap section 12 are rigidly secured to the mounting blocks 96 by passing a fastener 105 which may be a half dog point set screw through small holes in apertures 100 and 102 of the mounting blocks 96, and aligned threaded holes in the cargo rail sections 103 and 104. Locking pins 107 are also secured in holes 106 in the mounting blocks 96 coupled to cross rails 62 and 78, which pins then into aligned apertures in the tubular rail sections of adjoining cap sections to prevent lateral sliding of the rail sections as described below. In an embodiment, the locking pins 107 are an indexing plunger having a knob or ring attached to a spring-loaded pin, such that when the aperture in the movable tubular rail section is aligned with the pin 107, the pin 107 will automatically move into an extended position into such aperture. End caps 108 and 109 are also provided on the outer ends of the rails, connecting the pairs of rails together, while in some embodiments the rails may have individual ends caps, or the individual rails may alternatively comprise a single rail which has been angled or bent into the configuration of the upper and lower rail sections.

Upper and lower rail sections 103 and 104 on front cap section 12 are secured to mounting blocks 96 supported on cross rails 60, 62, and 92, and cap 108 connects between the forward ends of aligned pairs of cargo rail sections 103 and 104. As shown in FIG. 9, a rearward end of cargo rail sections 111 and 112 is secured in apertures 100 and 102 of the mounting blocks 96 on middle cap section 14, while the forward end of rail sections 111 and 112 extends forwardly and is positioned to be slidably inserted in apertures 100 and 102 of mounting blocks 96 on cross rail 62 of front cap section 12, as well as into the open ends of cargo rails sections 103 and 104, respectively. Upper and lower tubular rail sections 111 and 112 on middle cap section 14 have an outer diameter which is less than the inner diameter of tubular cargo rail sections 103 and 104 on the front cap section 12. This allows the forward ends of cargo rail sections 111 and 112 to be slidingly inserted into the rearward open ends of cargo rail sections 103 and 104. Accordingly, as middle cap section 14 is slidingly retracted into the front cap section 12 as described above, rail sections 111 are telescoping into rail sections 103, and rail sections 112 are telescoping into rails sections 104, while forward cross rail 76 of middle cap section 14 is able to slide underneath rearward cross rail 62 of the front cap section 10.

In tailgate or end cap section 16, shown in FIG. 11, forward upright members 80 and 84 are shorter in length than rearward upright members 70 and 74 on middle cap section 14, and in addition there are no mounting blocks 96 secured to forward cross rail 88. This allows forward cross rail 88 to slide underneath spacer 79 of the middle cap section 14, and tailgate cap section 16 to be nested with middle cap section 14. Rearward upright members 82 and 86 on tailgate cap section 16 are preferably the same length as uprights 52, 54, 56, and 58 of the front cap section 12, and rearward uprights 70 and 74 of the middle cap section 14. As a result, rearward cross rail 90 is positioned at the same height as top rails 60 and 62 of front cap section 12 and top rail 76 of middle cap section 14. Upper and lower tubular cargo rack rail members 115 and 116 are secured to mounting blocks 96 rearward cross rail 90 in respective apertures 100 and 102, with the forward ends of the rail members 115 and 116 above forward cross rail 88 of rear cap section 16 to be positioned in alignment with intermediate rail sections 111 and 112 of middle cap section 14. Rail sections 115 and 116 on tailgate cap section 16 have an outer diameter which is less than the inner diameter of cargo rail sections 111 and 112 on the middle cap section 14. As a result, when the cap sections are expanded and retracted, each tubular rail 115 of tailgate cap section 116 can easily pass slidingly into and out of corresponding tubular rail 111 on middle cap section 14, and each rail 116 of tailgate cap section 116 can easily slidingly pass into and out of corresponding rail 112 on middle cap section 14.

Figure 13:
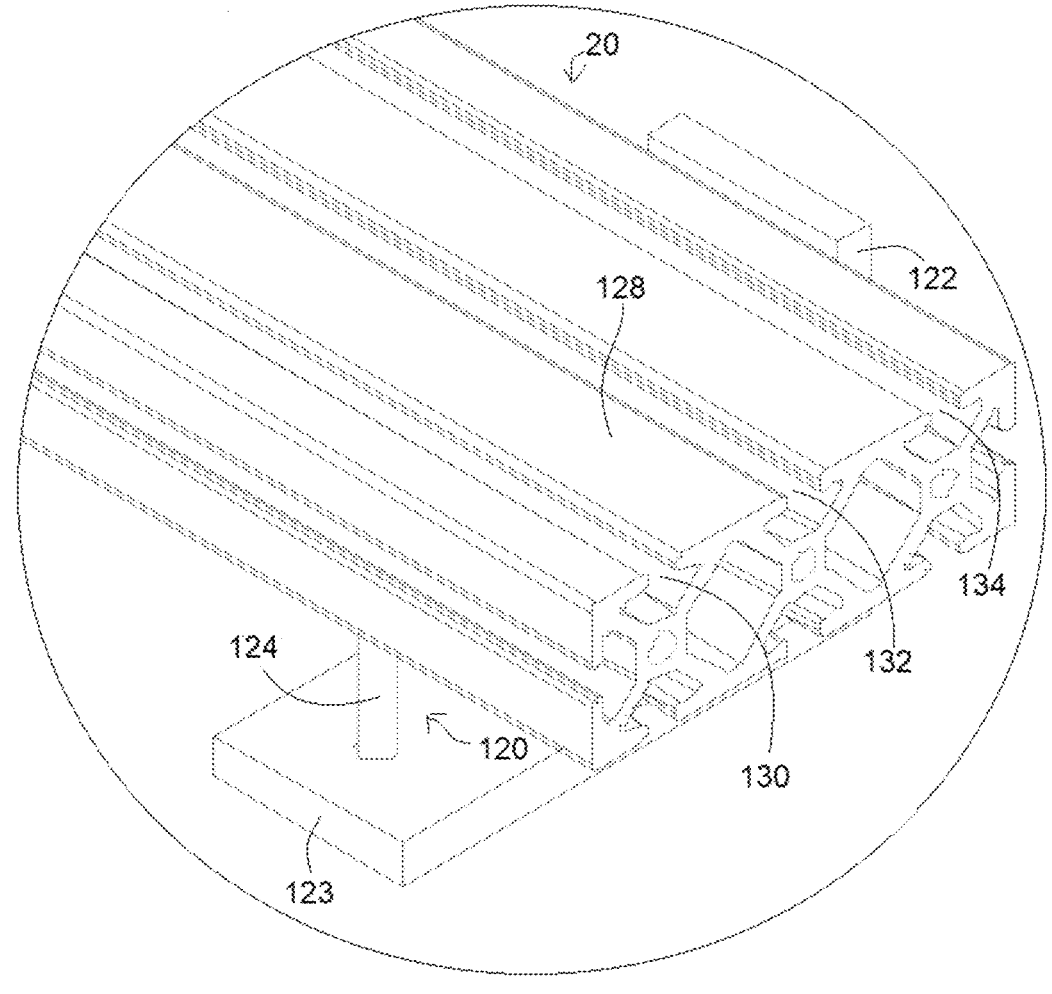
FIG. 13 is an enlarged top isometric end view of one of the main rails.

As indicated above, front, middle, and tailgate cap sections 12, 14, and 16 of truck cap assembly 10 are slidingly coupled to main rails 20 and 22, which are mounted to the opposite side walls of the utility vehicle cargo bed. Rail 20 will be mounted to the left or driver side truck bed side wall, and rail 22 will be mounted to the right or passenger side truck bed side wall. In an embodiment, L-shaped main rail anchors 120 are connected to opposite ends of the rails 20 and 22. As shown in FIGS. 4 and 13, main rail anchors 120 have a vertical leg 122 attached to a side wall of the rail extending downwardly, and a horizontal leg 123 which is positioned extending underneath the rail 20, 22 and is connected to the rail by bolts 124. One or more additional anchor plates 126, shown in FIG. 5, situated intermediate of the rail anchors 120 are similarly secured to the underside of the railings 20 and 22 by bolts 124, further securing the railings 20 and 22 to the truck bed side walls.

Main rails 20 and 22 each have a plurality of elongated channels formed in top wall 128 at least equal in number to the number of truck cap sections. In the illustrated embodiment including front, middle and rear cap sections 12, 14, and 16, main rails 20 and 22 therefore each have three channels in top wall 128, referred to generally herein as the outer channel, middle channel, and inner channel. Railing 20 includes outer channel 130, middle channel 132, and inner channel 134 (FIG. 13), while railing 22 similarly includes outer channel 136, middle channel 138, and inner channel 140 (FIG. 4). The channels extend along a longitudinal length of the railings 20 and 22 and each have an upwardly open slot. Base members 48, 64, and 82 of cap sections 12, 14, and 16 are slidingly secured to slots 130, 132, and 134, 132, and 130 of main railing 20, respectively, and base members 50, 66, and 83 of cap sections 12, 14, and 16 are slidingly secured to slots 136, 138, and 140 of railing 22, respectively, in a manner now explained.

The base members of the front cap section 12, middle cap section 14, and end cap section 16 are also selectively lockable against sliding on rails 20 and 22. A plurality of spaced-apart through-apertures 140 are formed in base members 48 and 50 of front cap section 12, base members 64 and 66 of middle cap section 14, and base members 76 and 78 of end cap section 16, which connect between the upper and lower walls of the base members Apertures 140 are configured to receive an externally threaded bolt member 142 (see FIG. 8) which may be a round head square neck fastener passed into the aperture from an underside of the base member. The square neck fastener prevents rotation of the fastener in the rail slots. As shown in FIGS. 3-4, the head portion 143 of the bolt member 142 is inserted into an end of the corresponding channel in the railing with the threaded shaft the bolt member extending upwardly out of the channel. The shaft section of bolt member 142 is then passed upwardly through the aperture 140 in the base section from the bottom, and an internally threaded locking handle 144 is secured to the opposite end of the shaft section on the upper side of the base rail. As shown in FIG. 5, in the illustrated embodiment, three locking handles 144 are connected to each base member 50 of front cap section 12, three locking handles 144 are connected to each base member 56 of middle cap section 14, and four locking handles 144 are connected to each base member 83 of end cap section 16 for securing the base members to the main rail 22. The locking handles 144 are positioned on the inner side of the corresponding side wall panel (28, 34, 40) of the cap section. It will be understood that the locking handles 144 are similarly arranged on base members 48, 54 and 82 to secure them to main rail 20 which is coupled to the opposite or driver side wall of the truck bed. The flat underside of the round head 143 of bolt member 142 is aligned with an upper inner wall of the corresponding slotted channel in the rail, such that turning the locking handle 144 in a first direction will cause the head 143 of the bolt member 142 to be tightly pulled upwardly into contact with the upper inner wall of the slotted channel, thereby clamping the base member with the railing and rigidly securing the cap section against sliding with respect to the rail. In this manner, the individual truck cap sections 12, 14, and 16 can each be conveniently unlocked, moved to a different location and then accordingly locked again in the new location.

FIGS. 14-19 illustrate details of the tailgate assembly 44 of the present invention, which generally includes an upper tailgate assembly 150 and a lower tailgate assembly 152. Upper tailgate assembly 150 comprises a top frame member 153, opposite side frame members 154 and 155, and a bottom frame member 156. Frame members 153, 154, 155, and 156 are connected on their ends to form a rigid framework which supports upper tailgate panel 158 and as shown in FIG. 2 encloses the rearward facing side of tailgate cap section 16. Top frame member 153 of upper tailgate assembly 150 is hingedly secured to hatch hinge mounting rail 91 connected to cross rail 90 of end cap section 16 by a hinge 160 (see FIG. 16). Tailgate lift supports 162 and 163 which may be gas springs or struts connect between side frame members 154 and 155 of upper tailgate assembly 150 and side uprights 82 and 86 of the rear cap section 16, and are configured to maintain tailgate assembly 44 in an upwardly pivoted or lifted position when opened. Locks 164 and 165 which may be hatch door t-handle locks are also coupled to upper tailgate panel 158 for locking tailgate 44 in a closed position.

Figures 14, 15, 16:
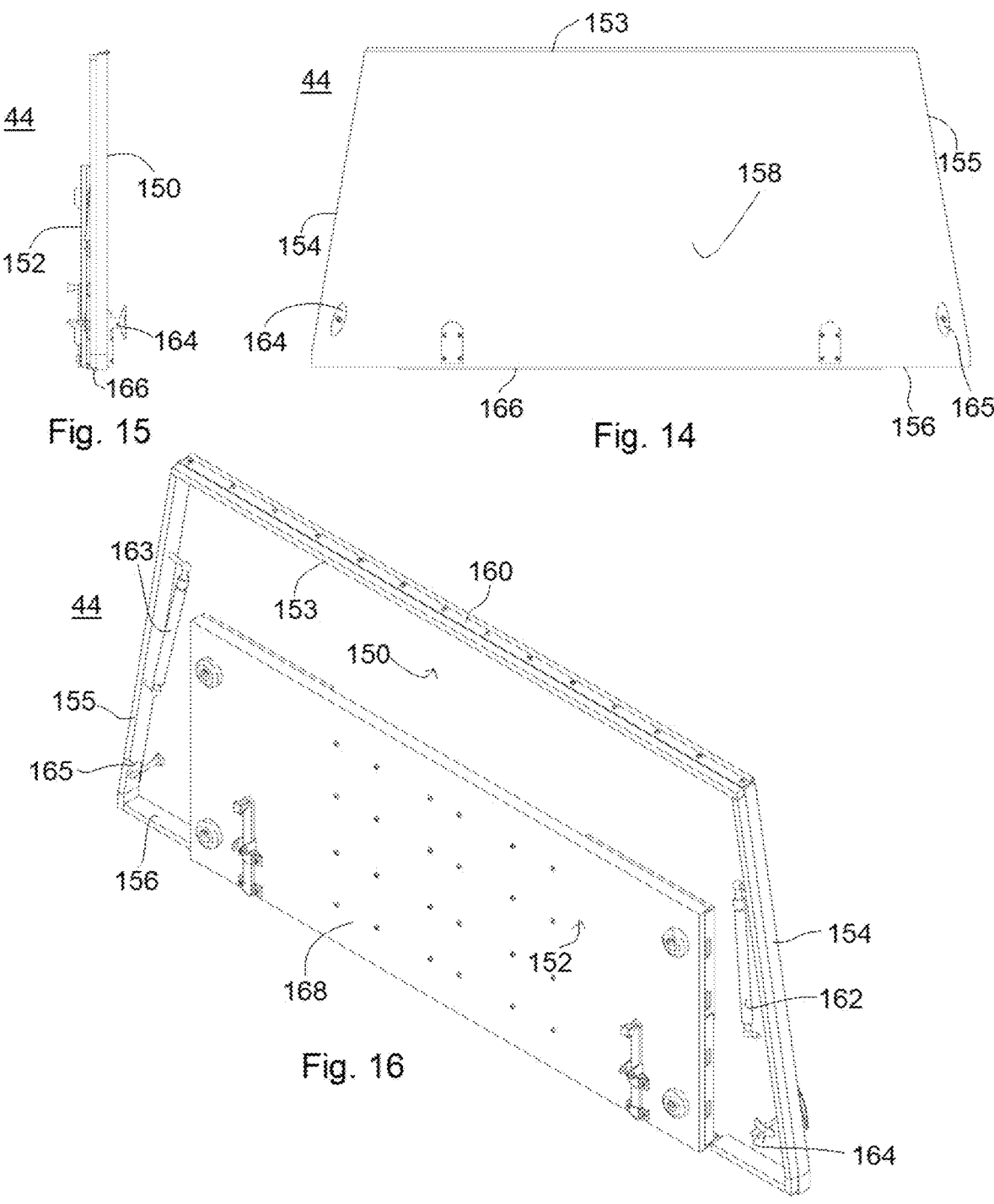
FIG. 14 is a rear elevation view of the upper tailgate assembly.
FIG. 15 is a side elevation view of the upper tailgate assembly also showing the lower tailgate assembly folded against an inner side of the upper tailgate assembly.
FIG. 16 is a top isometric view of the upper tailgate assembly showing the lower tailgate assembly folded as in FIG. 15.

Another hinge 166 which may be a piano hinge is coupled to bottom frame member 156 of the upper tailgate assembly 160. Hinge 166 pivotally connects lower tailgate assembly 152 to upper tailgate assembly 150, such that main lower tailgate panel 168 is movable between a raised position in which as shown in FIGS. 15 and 16 the main lower tailgate panel 168 is folded and secured against the inner surface of panel 158 of the upper tailgate assembly 150, and a lowered position shown in FIG. 17 in which the main lower tailgate panel 168 is extending downwardly from upper tailgate assembly 150. Main lower tailgate panel 168 has opposite side edges 170 and 171, an upper edge 172, and a lower edge 173. Locking members 174 (see FIG. 18) are coupled to main lower tailgate panel 168 and are utilized for locking the main lower tailgate panel 168 in an extended or lowered position. In an embodiment, locking members 174 may be latch barrel bolts or slide bolts which are coupled to the outwardly facing wall of the main lower tailgate panel 168 and are oriented or positioned for the bolts to be received in bolt catch plates coupled to the upper tailgate panel 158. Other types of locking members including but not limited to a hasp lock or internal bolts extending between the upper and lower tailgate sections may be alternatively provided. The locking members may also include padlock eyes positioned to receive a padlock and prevent the bolts from being released from the catch plates. When it is desired to unlock and raise the main lower tailgate panel 168 into a stored position against the inner wall of upper tailgate panel 158, the padlock is removed such that the locking members 174 can be released and the main lower tailgate panel 158 may be pivoted upwardly.

Main lower tailgate panel 168 is dimensioned such that when lowered the lower edge 173 abuts against or is in close proximity to the vehicle truck bed floor. As will be evident from the FIGS., main lower tailgate panel 168 is not as wide as upper tailgate panel 158, and preferably is dimensioned to have a width slightly less than the distance between the oppositely disposed wheel wells of the vehicle truck bed on which truck cap assembly 10 is mounted. The lower tailgate assembly 153 may be deployed whenever the cap assembly 10 is extended to less than a fully extended position. When deployed, the main lower tailgate panel 168 is preferably dimensioned to fit closely between the wheel wells of the truck bed.

Figures 17, 18:
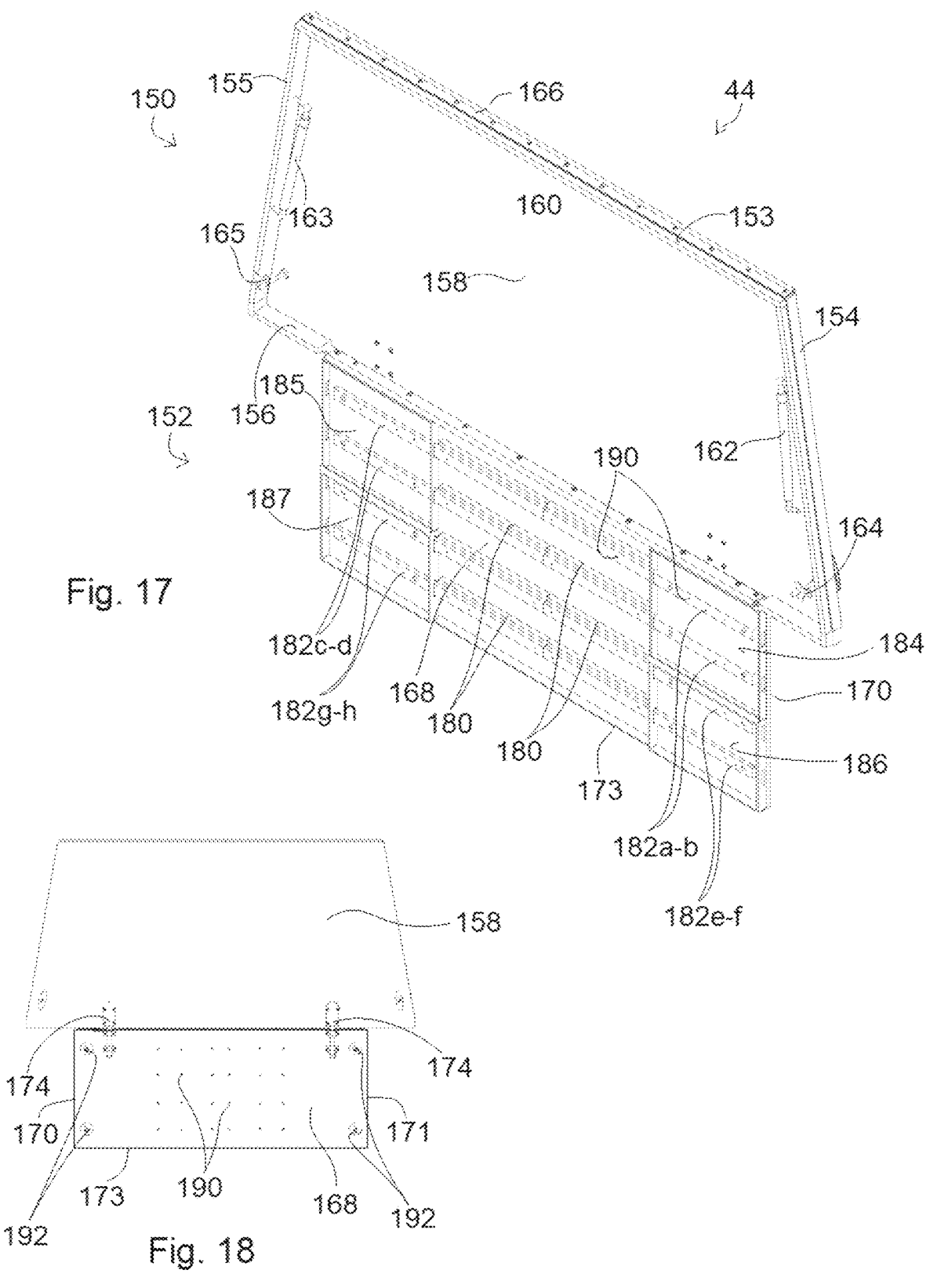
FIG. 17 is a top isometric view of the upper tailgate assembly as in FIG. 16 with the lower tailgate assembly extended.
FIG. 18 is an elevation outer side view of the tailgate with the lower tailgate assembly extended.

In addition, as best shown in FIG. 17, a plurality of brackets for mounting slide-out panels to the main lower tailgate panel 168 are coupled to the inner wall of panel 168. In the illustrated embodiment, each mounting bracket includes an elongated rail 180 which is secured to the inwardly facing wall (when lowered) of the main lower tailgate panel 168, and a slide member 182 which is slidable longitudinally on rail 180. Each slide member 182 is secured to an auxiliary panel forming another component of the lower tailgate assembly 152. In the illustrated embodiment, there are a total of eight mounting brackets, with rails 180 arranged in four horizontally aligned rows. There are two mounting brackets per row with the rails 180 oriented so that the slide members 182 in each row are extendable outwardly along the opposite side edges 170 and 171 of the main lower tailgate panel 168. Four slide-out panels are coupled to the main lower tailgate panel 168, namely, upper slide-out panels 184 and 185 and lower slide-out panels 186 and 187. In other embodiments, a greater or lesser number of slide-out panels may be provided. Two slide members 182 are coupled to and support each slide-out panel. Slide members 182*a-b* are coupled to slide-out panel 184, slide members 182*c-d* are coupled to slide-out panel 185, slide members 182*e-f* are coupled to slide-out panel 186, and slide members 182*g-h* are coupled to slide-out panel 187. The rails 180 of the mounting brackets are secured to the main lower tailgate panel 168 by suitable fasteners 190 such as button-head caps screws, and slide members 182 are each similarly secured to one of the slide-out panels 184, 185, 186, and 187 by suitable fasteners. A locking mechanism for securing each slide-out panel 184, 185, 186, and 187 in an extended position is also provided. In the illustrated embodiment, the locking mechanism comprises separate dead bolt locks 192 each of which is coupled to main lower tailgate panel 168 and one of the slide-out panels 184, 185, 186, and 187.

Slide-out panels 184 and 186 coupled to main lower tailgate panel 168 of lower tailgate assembly 152 are individually extendable from side edge 170 of panel 168, while slide-out panels 185 and 187 are individually extendable outwardly from side edge 171 of panel 168. Slide-out panels 184, 185, 186, and 187 are each dimensioned to be extended laterally outwardly and locked a distance so as to abut against an inner side of the truck bed side walls, or approximately the length of bottom frame member 166 of upper tailgate assembly 150. Upper slide-out panels 184 and 185 are intended to be extended whenever the truck cap 10 is positioned at a length covering less than the full length of the vehicle cargo bed, and it is desired to fully enclose and secure the cargo area underneath the cargo area. Upper slide-out panels 184 and 185 are dimensioned such that when extended fully outwardly and locked they will preferably abut against the inner side of the cargo bed side walls, and will enclose the area above the wheel wells of the truck bed and below the upper tailgate assembly 150. When the cap sections 12, 14, and 16 are extended to a length such that the tailgate 44 of rear cap section 16 is aligned with the wheel wells of the truck bed, as shown in FIG. 20, the upper slide-out panels 184, 185 are extended and locked to fully enclose the cab area. In this position, the lower slide-out panels 186 and 187 are not required to be extended to fully enclose the cargo area since the space that would be occupied by the lower slide-out panels 186 and 187 is already occupied by the wheel wells. Upper slide-out panels 184 and 185 thus have a vertical height that is slightly less than the distance between the lower edge of the upper tailgate assembly 150 and the upwardly facing surface of the truck bed wheel wells. A weatherstripping may also be provided along the edges of the main lower tailgate panel 168 and one or more of the slide-out panels.

When the truck cap 10 is fully retracted such as shown in FIG. 19 or is positioned at an intermediate length at which the tailgate 44 of rear cap section 16 is not aligned with the wheel wells of the truck bed, both upper slide-out panels 184 and 185 and lower slide-out panels 186 and 187 may be extended to fully enclose the cargo area. Alternatively, the slide-out panels 184, 185, 186, and 187 can be individually extended and locked as desired so as to selectively enclose portions of the cargo bed. Thus, the truck cap 10 can be extended rearwardly and secured at any intermediate length between a fully extended position and fully retracted position and may be fully enclosed and secured in any such position.

FIGS. 15 and 16 show the truck cap tailgate 44 with the lower tailgate assembly 152 in a stowed-away or raised position. The lower tailgate assembly 152 will be moved to a stowed-away position when the truck cap 10 is in a fully open or extended position covering the entire truck bed cargo area, as shown in FIGS. 1 and 2. In this configuration, the tailgate assembly 44 is being used as a standard lockable tailgate hatch door which mates with the truck bed tailgate, creating a fully secure, locked truck bed cargo area. FIGS. 17 and 18 show the truck cap tailgate 44 with main panel 168 of the lower tailgate assembly 152 in a lowered position, and with the laterally sliding panels 184, 185, 186, and 187 in a retracted position. This is the first step in deploying the lower tailgate assembly 162. In FIG. 19, the main panel 168 of the lower tailgate assembly 152 is in a lowered position, and both the upper slide-out panels 184 and 185 and lower slide-out panels 186 and 187 are extended laterally from opposite sides of the main panel 168. This arrangement will provide a fully secure and locked cargo area when the truck cap 10 is fully retracted or extended to a length at which the tailgate assembly 44 is not aligned with wheel wells of the truck bed cargo area. In FIG. 20, the main panel 168 of the lower tailgate assembly 152 is similarly in a lowered position, and the upper slide-out panels 184 and 185 are extended laterally from opposite sides of the main panel 168. However, the lower slide-out panels 186 and 187 are not extended. This arrangement will provide a fully secure and locked cargo area when the truck cap 10 is extended to a distance in which the tailgate assembly 44 is aligned with the wheel wells of the truck bed cargo area.

To achieve a fully open/extended configuration as shown in FIGS. 1 and 2, starting with a fully closed or retracted position shown in FIG. 19, the following procedure is followed. First, slide out panels 184, 185, 186, and 187 are unlocked and slid inwardly on the mounting rails, after which the main panel 168 of the lower tailgate assembly 152 is pivoted and stowed away in an upward configuration as in FIG. 16. The tailgate section hatch door 44 may then be swung open or upwards from the outside. The hatch door 44 will be held open by the assisted gas filled springs 162 and 163 on each side of the hatch door 44. The user now has full access to the inside of the truck cap assembly 10 from the truck bed. Once the inside of truck cap assembly 10 is accessed, tailgate cap section 16 will be the first section to be extended or slid out from the telescoped truck cap 10. Manual locking handles 144 on each base member 80 and 81 of the tailgate section 16 lock the tailgate section 16 against sliding. Handles 144 are rotated to unlock the base members 80 and 81 so tailgate section 16 can now slide rearwardly on the inner tracks 134 and 140 of main railings 20 and 22. At the same time, locking pin plungers 107 on mounting blocks 96 of cross rail 78 are released such that round rail sections 115 and 116 of the cargo rack 18 are able to extend rearwardly out of the corresponding round rail sections 111 and 112 of the rigid middle cap section 14.

Once tailgate cap section 16 is extended rearwardly, the locking handles 144 on base members 64 and 66 of the middle cap section 14 can be accessed from inside the truck cap assembly 10. The locking handles 144 are then turned to loosen base members 64 and 66 of middle cap section 14 from main railings 20 and 22. Once all of the locking handles 144 on middle cap section 14 have been loosened, the middle cap section 14 can be slid rearwardly on the center tracks 132 and 138 of the main railings 20 and 22. At the same time, locking pin plungers 107 on mounting blocks 96 on cross rail 68 of the cargo rack 18 are released so that the round rail sections 111 and 112 of the middle cap section 14 can be extended out of corresponding round rails 103 and 104 of the front cap section 12. To enclose the entire truck bed, the middle cap section 14 and tailgate cap section 16 are expanded to a full maximum length. When middle cap section 14 is fully expanded from front cap section 12, locking pin plungers 107 on mounting blocks 96 of cross rail 62 of front cap section 12 will lock the cross-rail sections 111 and 112 on the middle cap section 14 in a fully extended position with respect to cross rail sections 103 and 104 of front cap section 12. Similarly, when tailgate cap section 16 is fully expanded with respect to middle cap section 14, locking pin plungers 107 in mounting blocks 96 connected to outer cross rail 78 will automatically lock the cross-rail sections 115 and 116 on tailgate cap section 16 in a fully extended position with respect to cross rail sections 111 and 112 of middle cap section 14. Front cap section 12 will remain stationary in a locked "home" position at the front of the truck bed on the outer tracks 130 and 132 of the rails 20 and 22. Then, the locking handles 144 on middle cap section 14 and tailgate cap section 16 are tightened to secure the truck cap 10 in a fully extended configuration. Tailgate 44 can then also be swung down and closed against the pickup truck bed tailgate. The tailgate 44 is locked using the T handle locks 164 and 165.

If only the tailgate section 16 is to be partially expanded, for example, once the tailgate section 16 has been unlocked and slid to the desired position as described above, the locking handles 144 on base members 80 and 81 of the tailgate section 16 are rotated in the opposite direction to once again lock the tailgate section 16 against sliding on the inner rails 134 and 140. When the tailgate section 16 is opened a maximum distance with respect to the middle section 14, the four locking pins 107 on mounting blocks 96 on cross rail 78 will actuate from the mounting blocks 96 into the round rail sections 115 and 116 of the tailgate section 16, and also into the midsection baseplate. Once the inside of truck cap 10 is accessed, rigid rear or tailgate enclosure section 16 will be the first section to be extended or slid out from the telescoped truck cap 10. If desired, the lower tailgate assembly 152 is then released from the upper tailgate assembly 150 and pivoted downwardly, with the upper slide-out panels extended outwardly over the wheel wells and locked to enclose the portion of the cargo bed covered by the truck cap sections.

Figure 21:
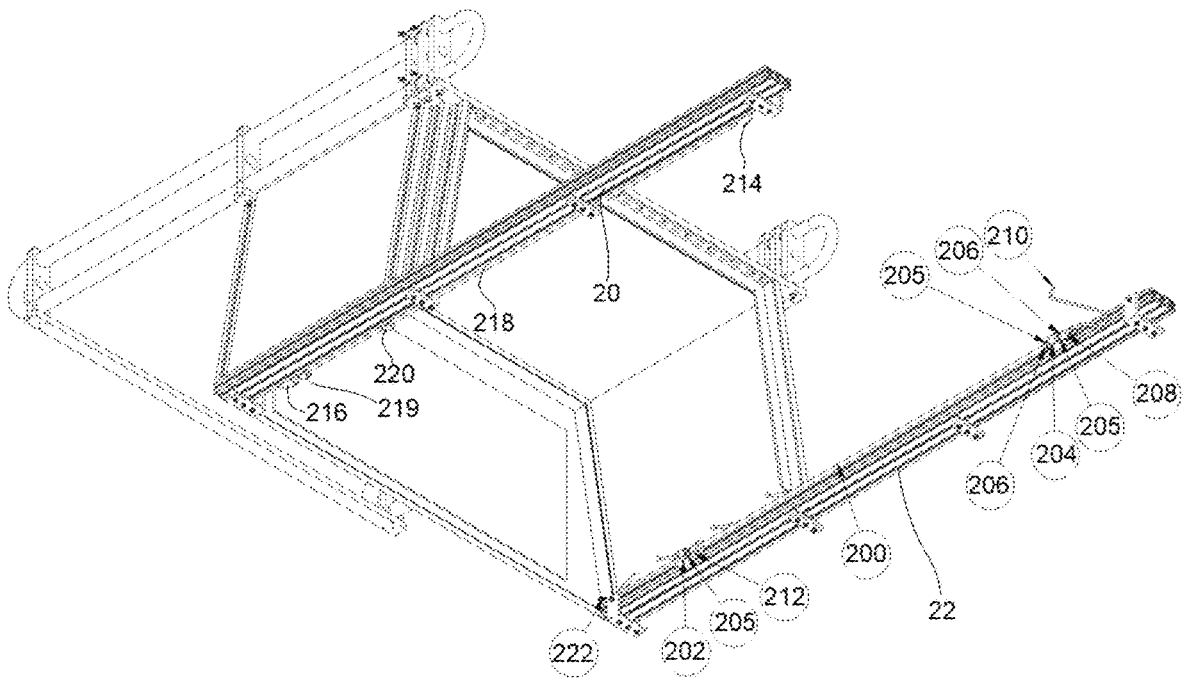
FIG. 21 is a bottom isometric view of the utility vehicle truck bed cap assembly in a fully retracted position and additionally illustrating a manual retracting and expanding mechanism.

In another embodiment of the invention, shown in FIG. 21, a manual hand crank mechanism for slidingly expanding and retracting the truck cap sections is provided. Commencing with the truck cap 10 in a telescoped or fully retracted position, to expand the truck cap, locking handles 144 in tailgate cap section 16 are loosened, so that cap section 16 can be linearly extended as described above. A threaded guide rod 200 is mounted between a spaced apart idle end mounting block 202 and a drive end mounting block 204 coupled to the main rail 22 on an inside face of the main rail 22. A shaft collar 206 having a thrust washer or bearing 205 connects the guide rod 200 to drive end mounting block 204, and another thrust washer 205 similarly supports the guide rod on idle end mounting block 202. Another collar connects the drive end mounting block 204 to threaded rod drive end 208, to which a removable hand crank 210 is securable to manually or mechanically open and close the truck cap sections. A threaded drive block 212 is also threadably mounted on guide rod 200.

In addition, guide rod mounting blocks 214 and 216 are mounted to the inside face of main rail 20 and support a guide rod 218. Guide rod 218 supports a pair of guide blocks 219 and 220 on rod 218. A rack tubing position lock 222 is also provided on each rail 20 and 22 to releasably connect to the tailgate cap section 16. Threaded guide rod 200 is freely rotatable between the mounting blocks 202 and 204. Drive block 212 is mounted directly to the base member 80 of the tailgate cap section 16. Drive block 212 is coupled with threaded drive rod 200 which drives the tailgate cap section 16 in a linear motion along the drive rod 200 and slides in its own inner track 220 on the main rail 22. In addition, main rail 20 on the opposing side wall of the truck bed has a guide rod 218 which is rigidly mounted between mounting blocks 214 and 216 on the inner face of the main rail 20. This creates a true guided railway for linear movement. Guide block 219 and 220 on guide rod 218 are directly mounted to the base plate 76 of the tailgate cap section 16, and also coupled with guide rod 218 which slides in linear movement on the guide rail 222 and the inner track 126 and 130 of the main rails 20, 22. At the same time, cargo rack rail section 115 and 116 on tailgate section 16 are being extended out of cargo rack rail sections 111 and 112 of the middle cap section 14. Hand crank 210 is attached to threaded rod drive end 204 of threaded drive rod 200, which is rotated in a clockwise direction to extend the tailgate cap section 16 and is rotated in a counterclockwise direction to retract the tailgate cap section 16. When the fully open length of the tailgate cap section 16 is reached, rack tube position lock 222 is actuated into the inside faces of base plate 76 in two places. In addition, position locks 107 on mounting blocks 96 extend into the outer side faces of round rail mounting block 96 on cross rail 90 of the tailgate cap section 16 in four places, locking round rail section 115 and 116 of the tailgate cap section 16 into round rail 111 and 112 of the middle cap section 14.

Next, the middle cap section 14 must be unlocked from the main rails 20 and 22 by rotating the locking handles 144. The middle cape section 14 will be guided on guide rod tail gate section and will slide in a linear motion on the center tracks 132 and 138 of main rails 20 and 22. Middle cap section 14 and end cap section 16 are coupled together by the rack tubing position lock in the base plate and round rail mounting block 96 on forward cross rail 62 of middle cap section 14. Thus, both cap sections 14 and 16 can now be cranked open by rotating the hand crank 210 to turn the threaded drive rod 200. The truck cap 10 is moved to a desired length covering a portion of the truck bed, or to a full open or maximum extended position covering the entire truck bed. When the truck cap 10 is fully extended or opened, locking pin 107 is also actuated into the cargo rack round rail mounting block 96 on cross rail 62 of front cap section 12. The front cap section 12 has a stationary "home" location and is locked in such location using the locking handles 144 on rails 48 and 50. The locking handles 144 on rails 64 and 66 of middle cap section 14 and on rails 76 and 78 of tailgate cap section 16 are also then tightened down to provide a fully locked rigid cap 10 mounted on main rails 20 and 22.

To fully retract or close the tailgate cap section 16 and middle cap section 14 together, the locking handles 144 on rails 64 and 66 of middle cap section 14 and on rails 76 and 78 of tailgate cap section 16 are loosened. In other embodiments of the invention, a motor driven mechanism for expanding and retracting the truck cap 10 will be provided, which will eliminate the need for the hand crank tool 210. In one arrangement, an electric DC motor is connected to rotate the threaded drive rod 200 in a direction to either extend or retract the cap sections. Proximity sensors may also be utilized to determine the location of the cap sections. A switching mechanism will also be connected to the motor for opening and closing the truck cap.

Figure 22:
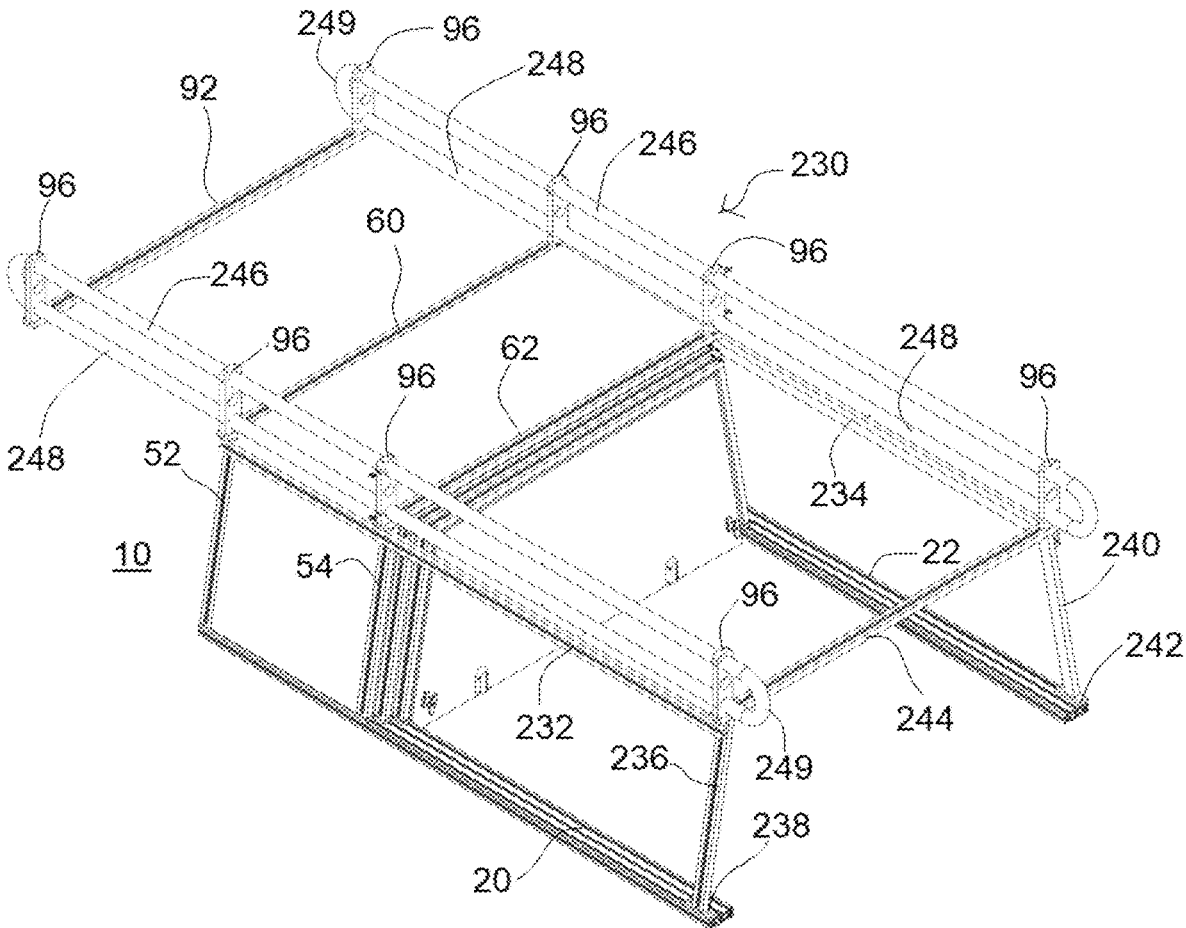
FIG. 22 is an isometric view of another embodiment of the utility vehicle truck bed cap assembly with the cap sections in a fully retracted position and in which the cargo rack is not collapsible.

FIG. 22 illustrates another embodiment of the truck cap assembly 10 wherein the cap sections 14 and 16 are independently extendable and retractable to any length between a fully extended and a fully retracted or telescoped position to enclose a desired portion of the cargo bed including the multi-lift hatch as in the previously described embodiment, with the difference however that the cargo rack 230 is not retractable. Rather, cargo rack 230 is stationary and comprises a rigid framework, such that cargo can be secured to the cargo rack 230 while the middle and rear cap sections 14 and 16 are positioned and repositioned at any open or closed position without removing the cargo from the rack. As in the collapsible version, the stationary cargo rack 230 includes a forward cross rail 92 which extends over the roof of the pickup truck cab, with mounting blocks 96 secured near to the outer ends of the cross rail 92. Additional mounting blocks 96 are also secured near to the outer ends of cross rails 60 and 62 of the front cap section 12 as in the collapsible version. Unlike the collapsible version, the stationary cargo rack 230 further comprises a rigid framework/equipment rack on both sides, which comprises a longitudinally extending rail 232, which is secured extending between upright members 52 and 54 of front cap section 12 in proximity to their upper ends, and another longitudinally extending rail 234 which is secured extending between upright members 56 and 58 of front cap section 12 in proximity to their upper ends. Another upright member 236 is rigidly connected to main rail 20 by a base plate 238 mounted to outer slot 130 of rail 20 near the rearward end of such rail 20, and another upright member 240 is similarly rigidly connected to outer slot 136 of rail 22 on base plate 242 near the rearward end of rail 22. A cross rail 244 which is similar in construction to cross rails 60, 62 and 92 then connects between the upper ends of upright members 236 and 240, forming a rigid framework for the stationary cargo rack 230 and which additionally may serve as an equipment rack. Additional mounting blocks 96 are coupled to the outer ends of cross rail 244, and longitudinally extending upper and lower cargo rack rails 246 and 248 then connect between the aligned mounting blocks 96 of the rigid framework, with end caps 249 connecting between the upper and lower rails 246 and 248 on both ends. In this configuration, front cap section 12 is rigidly secured to the base rails 20 and 22 and is not slidable, although in other embodiments the rigid cargo rack may be configured such that front cap section 12 is still slidable by providing separate front uprights to support the rigid framework of the cargo rack. The cargo rack rails 246 and 248 may be formed in individual sections connecting between aligned pairs of mounting blocks 96, or may be formed in longer sections extending between several or all of the aligned mounting brackets and joined by end caps 249. It will be understood that while the tubular rails of cargo rack 18 are shown as being cylindrical, they may have other shapes including but not limited to a rectangular or square tubing. In addition, the cargo rack in the various embodiments may comprise a greater or lesser number of rails rather than upper and lower rails.

Figure 23:
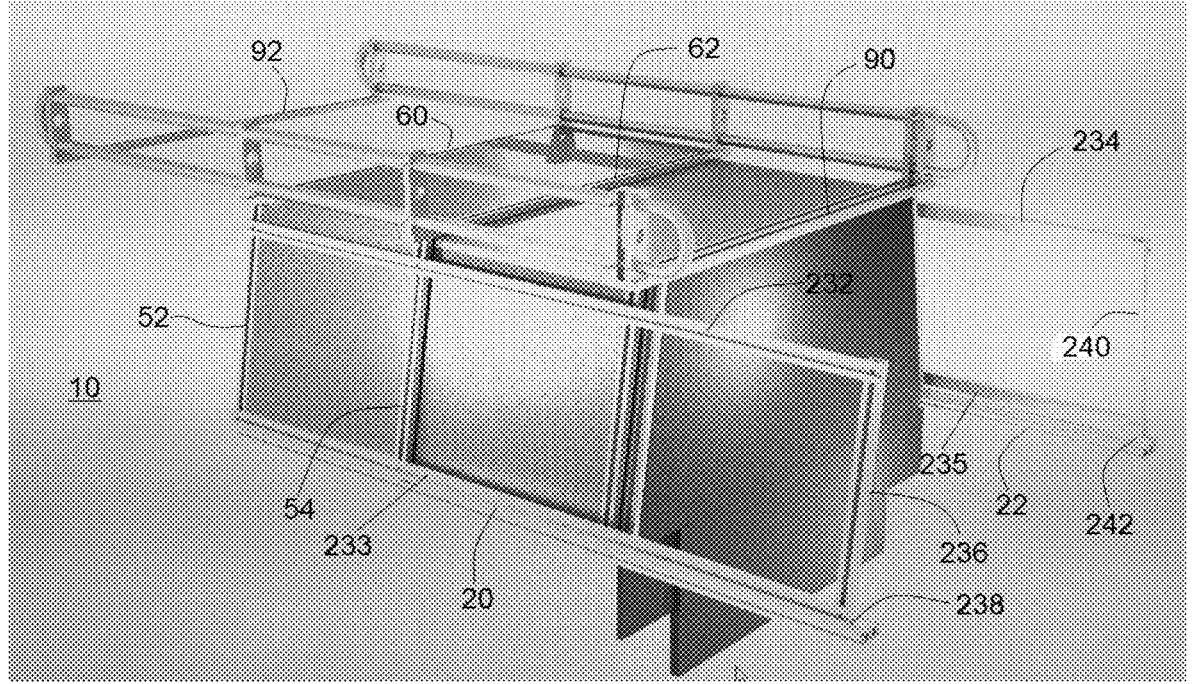
FIG. 23 is an isometric view of another embodiment of the utility vehicle truck bed cap assembly having a side horizontal accessory or equipment rack on both sides.

In addition, one or more accessories can be secured to the rigid framework formed by vertical rails 52, 54, and 236 which support longitudinal rail 232 on base rail 20, and vertical rails 56, 58, and 238 which support longitudinal rail 234 on base rail 22. Typical accessories include but are not limited to tool or other cargo boxes having side opening doors, conduit carriers, and racks for carrying spare tires or other materials or equipment such as a ladder, sporting and/or camping equipment. FIG. 23 illustrates another embodiment of the truck cap assembly 10 wherein the cap sections 14 and 16 and cargo rack 18 are both simultaneously extendable and retractable as in earlier described embodiments, with the difference however that a rigid framework/equipment rack similar to the arrangement shown in FIG. 22 is also provided. The rigid framework similarly comprises a longitudinally extending rail 232 on the driver's side of the truck cap assembly 10 which is coupled extending between upright members 52 and 54 of front cap section 12. Longitudinal rail 232 is positioned in proximity to but spaced from the upper ends of upright members 52 and 54, and is also spaced from cross members 60 and 62 of front cap section 12. Another upright member 236 is rigidly connected on its inner end to rail 20 near the rearward end of such rail 20 via by a base plate 238 mounted to outer slot 130 of rail 20, and the opposite end of longitudinal rail 232 is also connected to upright member 236. In addition, another lower longitudinally extending rail 233 is similarly connected extending between upright members 56 and 58 of front cap section 12 and upright member 236 in close proximity to the main rail 20. On the passenger's side, another longitudinally extending rail 234 is similarly secured to upright members 56 and 58 of front cap section 12 in proximity to but spaced from their upper ends, and to the outer end of another upright member 240 which is rigidly connected to rail 22 on base plate 242 near the rearward end of rail 22. In addition, a lower longitudinal rail connects between upright members 56, 58 and 240, forming a rigid framework. A cross rail similar to cross rail 244 connecting between the upper ends of upright members 236 and 240, although not shown in FIG. 23, may also be provided. In this embodiment, the rigid framework on the sides of the truck cap assembly 10 is not intended to provide additional support for the cargo rack, but rather is used to couple one or more accessories to the cap assembly 10 while, providing a more versatile cap structure.

In other embodiments, the extreme pro utility/adventure truck cap 10 may have a multitude of other features, such as side access doors in one or more of the side or top panels of the front, middle, or rear cap sections. The present truck cap design has the versatility to be used by truck owners carrying a wide range of different equipment ranging from camping gear, pop-up tents and the like for adventure overlander seekers, camping or in farming industries to carry smaller livestock sheep, pigs, and goats wherein the extendable truck cap sections may be formed with expanded steel mesh panels. creating a rigid caged enclosure.

The foregoing description has been presented for purposes of illustration and description and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. An extendable and retractable truck bed cap assembly comprising:
   a truck cap adapted to be disposed over an open top of a truck bed, the truck cap including at least a front cap section and a rear cap section;
   a pair of elongated base rails mountable to a side wall of the truck bed, each of the base rails including at least two longitudinally extending parallel tracks, wherein the front cap and rear cap sections of the truck cap are slidably mounted to the tracks of the base rails and are lockable against sliding on the base rails in any position between a fully extended position covering the entire truck bed and a fully retracted position with the rear cap section telescoped with the front cap section; and
   a tailgate assembly coupled to the rear cap section, said tailgate assembly including an upper tailgate assembly and a lower tailgate assembly, the lower tailgate assembly pivotably connected to the upper tailgate assembly and movable between a raised position and a lowered position extending between a lower edge of the upper tailgate assembly and floor of the truck bed, said lower tailgate assembly including a lower tailgate main panel dimensioned to fit closely between opposite wheel wells formed in the truck bed, and a plurality of slide-out panels connected to the lower tailgate main panel and selectively extendable laterally outwardly from the lower tailgate main panel as needed to fully enclose the area of the truck bed under the truck cap.

2. The truck cap assembly of claim 1 wherein the slide-out panels connected to the lower tailgate main panel further comprise upper and lower slide-out panels mounted to extend laterally outwardly from opposite sides of the lower tailgate main panel towards the truck bed side walls.

3. The truck cap assembly of claim 1 wherein the truck cap further comprises a middle cap section which is slidably mounted on the base rails to separate tracks from the front and rear cap sections and is lockable against sliding on the base rails in any longitudinal position on the base rails.

4. The truck cap assembly of claim 3 additionally comprising a top mounted cargo rack connected to the front and rear cap sections.

5. The truck cap assembly of claim 4 wherein the cargo rack is extendable and retractable with the rear cap sections.

6. A retractable cap assembly for selectively covering portions of a cargo bed of a utility vehicle, the cargo bed including a floor, a front end wall, opposite side walls, and a tailgate, the cap assembly comprising:
   an elongated guide rail coupled to a top railing of one of the side walls of the cargo bed, and another elongated guide rail coupled to a top railing of the other side wall;
   at least two substantially rigid nestable cap sections including a front cap section and a rear cap section, said nestable cap sections extending over the floor of the cargo bed and slidably connected to the guide rails;
   a tailgate assembly connected to the rear cap section for enclosing a rearward facing side of the rear cap section, said tailgate assembly including an upper tailgate assembly and a lower tailgate main panel coupled to a bottom frame member of the upper tailgate assembly and being extendable downwardly from the upper tailgate assembly between wheel wells formed in the cargo bed to the floor of the cargo bed when the rear cap section is not in a fully extended position; and upper and lower slide-out panels mounted to the lower tailgate main panel which are selectively extendable laterally outwardly from the lower tailgate main panel to the cargo bed side walls as needed to enclose the portion of the cargo bed covered by the cap assembly when the rear cap section is not fully extended.

7. The cap assembly of claim 6 wherein the upper and lower slide-out panels are extendable from opposite side edges of the lower tailgate main panel.

8. The cap assembly of claim 7 wherein when the rear cap section is moved to a partially extended position with the tailgate assembly not aligned with the wheel wells formed in the cargo bed, both the upper and lower slide-out panels are extended to the side walls of the cargo bed to fully enclose the portion of the cargo bed covered by the cap assembly.

9. The cap assembly of claim 7 wherein when the rear cap section is moved to a partially extended position with the tailgate assembly aligned with the wheel wells formed in the cargo bed, only the upper slide-out panels are extended to the side walls of the cargo bed to fully enclose the portion of the cargo bed covered by the cap assembly.

10. The cap assembly of claim 6 additionally comprising a mounting bracket including a rail coupled to an inner side of the lower tailgate main panel and an extendable and retractable slide member connected to the rail and coupled to one of the slide-out panels.

11. The cap assembly of claim 10 further comprising a drum lock for securing the slide member and slide-out panel in an extended position.

12. The cap assembly of claim 6 wherein the lower tailgate main panel is hingedly coupled to the bottom frame member of the upper tailgate assembly and is storable in a folded position against an inner side of the upper tailgate assembly.

13. The cap assembly of claim 12 further comprising a barrel bolt or slide bolt for locking the lower tailgate main panel in an extended position.

14. The cap assembly of claim 6 further comprising an extendable and retractable top mounted cargo rack coupled to the nestable cap sections.

15. The cap assembly of claim 14 further comprising a middle cap section which is slidably mounted on the guide rails and is nestable between the front cap section and rear cap section.

16. The cap assembly of claim 6 further comprising a plurality of elongated slotted channels formed in the guide rails, and wherein each of said cap sections is slidably secured to one of the slotted channels.

17. The cap assembly of claim 16 further comprising locking handles for securing the cap sections against sliding in the slotted channels in any position on the guide rails.

18. A telescoping cap assembly for selectively covering portions of a cargo bed of a utility vehicle, the cargo bed having a floor, a front end wall, opposite side walls, and a rear tailgate, comprising:

at least two substantially rigid nestable cap sections including a front cap section and a rear cap section;

a guide rail mounted to each opposite side wall of the cargo bed, the guide rail including a number of elongated channels at least equal to the number of cap sections, each of the elongated channels having an upwardly open slot;

the nestable cap sections each including a pair of base members which are slidably coupled to one of the channels of the guide rails by one or more locking members, the locking members each including an enlarged head portion positioned in one of the channels, a shaft portion extending through the upwardly open slot in the elongated channel and a through-aperture in the base members, and a locking handle connected to the shaft portion such that rotating the locking handle will clamp the base members to the guide rails and secure the cap sections against sliding on the guide rails at any longitudinal position on the guide rails, and a tailgate assembly connected to the rear cap section for enclosing the rear cap section at any extended position on the guide rails.

19. The telescoping cap assembly of claim 18 wherein the tailgate assembly connected to the rear cap section further comprises an upper tailgate section and a lower tailgate section hingedly connected to the upper cap section and being extendable downwardly from the upper tailgate section and having a lower tailgate main panel dimensioned to extend between wheel wells in the cargo bed, and upper and lower slide-out panels mounted to the lower tailgate main panel to be selectively extended from the main panel towards the cargo bed side walls.

20. The telescoping cap assembly of claim 19 further comprising a manual crank mechanism or a motor driven mechanism for slidingly expanding and retracting the nestable cap sections.

* * * * *